(12) United States Patent
McGory et al.

(10) Patent No.: US 11,712,935 B2
(45) Date of Patent: Aug. 1, 2023

(54) FRAME AND TRIM RINGS FOR UNDERBED HITCH MOUNTING SYSTEM

(71) Applicant: HORIZON GLOBAL AMERICAS INC., Plymouth, MI (US)

(72) Inventors: Michael J. McGory, West Bloomfield, MI (US); Piyush Pradeepkumar Khater, Canton, MI (US); Joel Thomas Runyan, Ypsilanti, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 211 days.

(21) Appl. No.: 17/012,659

(22) Filed: Sep. 4, 2020

(65) Prior Publication Data

US 2020/0398622 A1    Dec. 24, 2020

Related U.S. Application Data

(63) Continuation of application No. 15/180,548, filed on Jun. 13, 2016, now Pat. No. 10,766,322.
(Continued)

(51) Int. Cl.
    *B60D 1/48* (2006.01)
    *B60D 1/06* (2006.01)
    *B60D 1/01* (2006.01)

(52) U.S. Cl.
    CPC ............ *B60D 1/488* (2013.01); *B60D 1/015* (2013.01); *B60D 1/065* (2013.01); *B60D 1/485* (2013.01)

(58) Field of Classification Search
    CPC ........ B60D 1/488; B60D 1/015; B60D 1/065; B60D 1/485
    See application file for complete search history.

(56) References Cited

U.S. PATENT DOCUMENTS

| 1,958,723 A | 5/1934 | Spencer |
| 1,996,162 A | 4/1935 | Lubbers |

(Continued)

FOREIGN PATENT DOCUMENTS

| DE | 2121876 | 4/1971 |
| EP | 0038928 B1 | 4/1981 |

(Continued)

OTHER PUBLICATIONS

Cequent Towing Products, Inc., Installation Instructions Mounting Kit Ford F250/F350/F450 LD/HD/SD 6' & 8' Beds, Dec. 13, 2006, pp. 1-11, Litho in USA.

(Continued)

*Primary Examiner* — Jacob D Knutson
*Assistant Examiner* — Marlon A Arce
(74) *Attorney, Agent, or Firm* — McDonald Hopkins LLC

(57) ABSTRACT

The mounting system may be utilized for towing vehicles wherein the mounting system may selectively accommodate either a fifth wheel hitch or a gooseneck hitch. The mounting system may include a structural frame member including at least one rail capable of being connected to a vehicle frame, wherein the rail includes at least one socket. The socket may be engaged with a receiving member, wherein the receiving member may be engaged with a leg of a fifth wheel hitch. A mid rail may be connected to the rails and may include a hitch ball socket that is capable of engagement with a hitch. Also provided is an underbed hitch mounting system having at least one socket and receiving member exposed above a bed of a vehicle. The system includes trim and ring brackets configured to cover the exposed socket and receiving members along the bed of the vehicle.

9 Claims, 25 Drawing Sheets

Related U.S. Application Data

(60) Provisional application No. 62/174,388, filed on Jun. 11, 2015.

(56) References Cited

U.S. PATENT DOCUMENTS

| | | |
|---|---|---|
| 2,027,990 A | 1/1936 | Lubbers |
| 2,041,124 A | 5/1936 | Francis |
| 2,289,079 A | 7/1942 | Seyferth |
| 2,507,616 A | 5/1950 | Stephen |
| 2,513,117 A | 6/1950 | Stephen |
| 2,543,749 A | 3/1951 | Walther |
| 2,610,069 A | 9/1952 | Ketel |
| 2,621,056 A | 12/1952 | Kayler |
| 2,680,627 A | 6/1954 | Johnson et al. |
| 2,749,144 A | 6/1956 | Kayler |
| 2,778,657 A | 1/1957 | Chaplin |
| 2,779,605 A | 1/1957 | Braunberger |
| 2,799,516 A | 7/1957 | Greenway |
| 2,809,851 A | 10/1957 | Beck |
| 2,819,096 A | 1/1958 | Sencenich |
| 2,856,203 A | 10/1958 | Kayler |
| 2,860,891 A | 11/1958 | Ramun |
| 2,900,194 A | 8/1959 | De Lay |
| 2,925,286 A | 2/1960 | Hodges, Jr. et al. |
| 2,977,137 A | 3/1961 | Durham |
| 2,985,463 A | 5/1961 | Geerds |
| 3,073,624 A | 1/1963 | Thomas |
| 3,112,936 A | 12/1963 | Cole et al. |
| 3,170,716 A | 2/1965 | Walther et al. |
| 3,171,672 A | 3/1965 | Dalton |
| 3,198,549 A | 8/1965 | Martin |
| 3,220,750 A | 11/1965 | Mead |
| 3,318,616 A | 5/1967 | Fontaine et al. |
| 3,402,944 A | 9/1968 | Day |
| 3,584,899 A | 6/1971 | Gottler et al. |
| 3,595,125 A | 7/1971 | Jacobs |
| 3,606,384 A | 9/1971 | Fontaine et al. |
| 3,630,545 A | 12/1971 | Fontaine et al. |
| 3,640,549 A | 2/1972 | Neff et al. |
| 3,746,369 A | 7/1973 | Neff et al. |
| 3,844,584 A | 10/1974 | Fontaine |
| 3,847,414 A | 11/1974 | Madura |
| 3,861,709 A | 1/1975 | Mulcahy et al. |
| 3,888,514 A | 6/1975 | Klein |
| 3,893,710 A | 7/1975 | Madura |
| 3,941,407 A | 3/1976 | Breford |
| 4,017,095 A | 4/1977 | Best |
| 4,029,335 A | 6/1977 | Cady et al. |
| 4,039,087 A | 8/1977 | Sandvick, Sr. |
| 4,134,601 A | 1/1979 | Propst |
| 4,256,324 A | 3/1981 | Hamilton |
| 4,429,892 A | 2/1984 | Frampton et al. |
| 4,477,100 A | 10/1984 | Elyakim |
| 4,505,344 A | 3/1985 | Hobbs et al. |
| 4,531,774 A | 7/1985 | Whatley |
| 4,614,355 A | 9/1986 | Koch |
| 4,721,323 A | 1/1988 | Czuk et al. |
| 4,856,804 A | 8/1989 | Nash |
| 4,892,324 A | 1/1990 | Spencer et al. |
| 4,921,266 A | 5/1990 | Beals |
| 4,928,987 A | 5/1990 | Hunger |
| 4,946,183 A | 8/1990 | Benson et al. |
| 4,960,288 A | 10/1990 | Chambers |
| 4,962,945 A | 10/1990 | Vannoy et al. |
| 5,044,651 A | 9/1991 | Weikel |
| 5,120,080 A | 6/1992 | Ritter |
| 5,141,277 A | 8/1992 | Alexander |
| 5,150,803 A * | 9/1992 | Cartellone ............ A47J 31/4407 220/86.1 |
| 5,246,244 A | 9/1993 | Colibert |
| 5,306,037 A | 4/1994 | Robertson |
| D362,224 S | 9/1995 | McCoy et al. |
| 5,449,191 A | 9/1995 | Cattau |
| 5,509,682 A | 4/1996 | Lindenman et al. |
| 5,516,137 A | 5/1996 | Kass et al. |
| 5,529,329 A | 6/1996 | McCoy |
| D376,751 S | 12/1996 | Hanson et al. |
| 5,580,073 A | 12/1996 | Irwin et al. |
| D378,077 S | 2/1997 | Lindenman et al. |
| 5,707,070 A | 1/1998 | Lindenman et al. |
| 5,738,471 A | 4/1998 | Zentner et al. |
| 5,772,229 A | 6/1998 | Cattau |
| 5,839,745 A | 11/1998 | Cattau et al. |
| 5,971,418 A | 10/1999 | Lindenman et al. |
| 6,065,766 A | 5/2000 | Pulliam |
| 6,170,850 B1 | 1/2001 | Works |
| 6,179,316 B1 | 1/2001 | Sibley, Jr. |
| 6,199,889 B1 | 3/2001 | Golembiewski et al. |
| 6,467,791 B1 | 10/2002 | Fandrich et al. |
| 6,502,846 B2 | 1/2003 | Fandrich et al. |
| 6,520,528 B2 | 2/2003 | Fandrich et al. |
| 6,523,841 B2 | 2/2003 | Glaser |
| 6,533,308 B1 | 3/2003 | Tambormino |
| 6,739,402 B1 | 5/2004 | Olson |
| 6,758,921 B1 | 7/2004 | Struebel |
| 6,824,157 B1 | 11/2004 | Putnam |
| 6,851,695 B2 | 2/2005 | Lindenman et al. |
| 6,880,875 B2 * | 4/2005 | McClure ................ B62D 43/10 224/42.2 |
| 6,969,090 B1 | 11/2005 | Works |
| 7,121,573 B2 | 10/2006 | Lindenman et al. |
| 7,264,259 B2 | 9/2007 | Lindenman et al. |
| 7,413,390 B1 | 8/2008 | Allison et al. |
| 7,775,541 B2 | 8/2010 | Linger et al. |
| 7,793,968 B1 * | 9/2010 | Withers ................. B60D 1/485 280/425.2 |
| 7,828,317 B2 | 11/2010 | Withers et al. |
| 8,414,009 B2 | 4/2013 | Stanifer |
| 8,814,254 B1 | 8/2014 | Peffley |
| 9,067,468 B2 | 6/2015 | Stanifer et al. |
| 9,096,104 B1 * | 8/2015 | Jaynes ..................... B60D 1/24 |
| 9,180,745 B1 * | 11/2015 | Courtright ............ B60D 1/488 |
| 9,545,873 B2 * | 1/2017 | Courtright ......... B62D 53/0807 |
| 2003/0015855 A1 | 1/2003 | McCoy et al. |
| 2003/0038452 A1 | 2/2003 | Lindenman et al. |
| 2003/0209878 A1 | 11/2003 | Lindenman et al. |
| 2003/0209879 A1 | 11/2003 | Lindenman et al. |
| 2008/0238035 A1 * | 10/2008 | Stutts ..................... B60D 1/363 280/477 |
| 2009/0295122 A1 | 12/2009 | Withers et al. |
| 2010/0109285 A1 | 5/2010 | Stanifer et al. |
| 2014/0339791 A1 * | 11/2014 | McCall ................. B60D 1/485 280/491.5 |
| 2015/0273962 A1 | 6/2015 | Stanifer et al. |
| 2017/0036617 A1 * | 2/2017 | Greggs .................... B60P 1/44 |

FOREIGN PATENT DOCUMENTS

| | | |
|---|---|---|
| EP | 1078785 A2 | 2/2001 |
| EP | 1036679 B1 | 8/2004 |
| WO | WO2009030026 A1 | 3/2009 |

OTHER PUBLICATIONS

Cequent Performance Products, Installation Instructions Gooseneck Mounting Kit Chevrolet/GMC 2500/3500 Heavy Duty Short & Long Bed, (Part No. 4456), Apr. 11, 2011, pp. 1-8.

Instruction Sheet No. 63102N, Make/Model(s) Hide-A-Goose, Mar. 26, 2007, 4 pages.

Instruction Sheet No. 50117N, Make/Model(s) Dodge Pick-Ups, 2003-UP 2500, 3500 All Models, Mar. 22, 2007, 3 pages.

Cequent Towing Products, Inc., Operating Instructions Signature Series 5th Wheel Slider Hitch, pp. 1-12, Jan. 23, 2004, Litho in USA.

Cequent Towing Products, Inc., Installation Instructions Mounting Kit GM '99-'07 "Classic" 1500 (LD/HD) and 2500 5'8" & 6'6" Beds Only, Aug. 29, 2008, 10 pages, Litho in USA.

Cequent Towing Products, Inc., Installation Instructions Mounting Kit Ford 2004-Current F150 5.5', 6' and 8' Beds, 11 pages, Aug. 21, 2008, Litho in USA.

(56) References Cited

OTHER PUBLICATIONS

Cequent Towing Products, Inc., Assembly Instructions Signature Series 24K 5th Wheel Hitch, pp. 1-11, Jan. 28, 2004, Litho in USA.
Draw-Tite Catalog 2004, 7 pages.
Draw-Tite Catalog 2005, 7 pages.
Draw-Tite Catalog 2006, 5 pages.
Draw-Tite Catalog, 2007, 6 pages.
Draw-Tite Catalog, 2008, 3 pages.
Reese Catalog, 2004, 8 pages.
Reese Catalog, 2005, 9 pages.
Reese Catalog, 2006, 6 pages.
Reese Catalog, 2007, 7 pages.
Reese Catalog, 2008, 5 pages.
Cequent Towing Products, Inc., Operating Instructions Signature Series 5th Wheel Slider Hitch, pp. 1-12, Dec. 13, 2004, Litho in USA.
Cequent Towing Products, Inc., Assembly Instructions Signature Series 5th Wheel Slider Hitch, pp. 1-16, Jan. 23, 2004, Litho in USA.
Cequent Towing Products, Inc., Assembly Instructions Signature Series 5th Wheel Slider Hitch, pp. 1-16, Jan. 5, 2004, Litho in USA.
Cequent Towing Products, Inc., Assembly Instructions Signature Series 16K 5th Wheel Hitch, pp. 1-11, Mar. 15, 2005, Litho in USA.
Cequent Towing Products, Inc., Assembly Instructions Signature Series 24K 5th Wheel Hitch, pp. 1-11, Dec. 13, 2004, Litho in USA.
Cequent Towing Products, Inc., Operating Instructions Signature Series 16K 5th Wheel Hitch, pp. 1-9, Dec. 14, 2004, Litho in USA.
Cequent Towing Products, Inc., Assembly Instructions Signature Series Gooseneck, pp. 1-14, Oct. 13, 2006, Litho in USA.
Cequent Towing Products, Inc., Assembly Instructions Signature Series 24K 5th Wheel Hitch, pp. 1-11, Jun. 15, 2006, Litho in USA.
Cequent Towing Products, Inc., Assembly Instructions Signature Series 24K 5th Wheel Hitch, pp. 1-11, May 21, 2008, Litho in USA.
Cequent Towing Products, Inc., Assembly Instructions Signature Series 5th Wheel Slider Hitch, pp. 1-17, Jun. 2, 2004, Litho in USA.
Cequent Towing Products, Inc., Operating Instructions Signature Series 24K 5th Wheel Hitch, pp. 1-9, Mar. 15, 2005, Litho in USA.
Cequent Towing Products, Inc., Operating Instructions Signature Series 24K 5th Wheel Hitch, pp. 1-9, May 21, 2008, Litho in USA.
Cequent Towing Products, Inc., Operating Instructions Signature Series 24K 5th Wheel Hitch, pp. 1-9, Dec. 14, 2004, Litho in USA.
Cequent Towing Products, Inc., Operating Instructions Signature Series 24K 5th Wheel Hitch, pp. 1-9, Aug. 20, 2007, Litho in USA.
Cequent Towing Products, Inc., Assembly Instructions Signature Series 24K 5th Wheel Hitch, pp. 1-11, Jan. 6, 2006, Litho in USA.
Cequent Towing Products, Inc., Operating Instructions Signature Series 24K 5th Wheel Hitch, pp. 1-9, Jan. 28, 2004, Litho in USA.
Cequent Towing Products, Inc., Assembly Instructions Signature Series 5th Wheel Slider Hitch, pp. 1-17, Jan. 24, 2007, Litho in USA.
Cequent Towing Products, Inc., Operating Instructions Signature Series 5th Wheel Slider Hitch, pp. 1-12, Aug. 20, 2007, Litho in USA.
Cequent Towing Products, Inc., Operating Instructions Signature Series 5th Wheel Slider Hitch, pp. 1-12, Jan. 25, 2007, Litho in USA.
Anonymous, "5th wheel Prep Package hole cover trouble—Ford Truck Enthusiasts Forums", Post from Oct. 3, 2012 by cmunsonl, URL:http://www.ford-trucks.com/forums/1045 039-5th-wheel-prep-package-hole-cover-trouble.html [retrieved on Dec. 5, 2016].
International Search Report for International App. No. PCT/US2016/037182 dated Nov. 11, 2016.
International Search Report for International App. No. PCT/US2011/063922 dated May 8, 2012.

* cited by examiner

FRAME AND TRIM RINGS FOR UNDERBED HITCH MOUNTING SYSTEM

CROSS-REFERENCE TO RELATED APPLICATION

This application is a continuation of U.S. patent application Ser. No. 15/180,548, entitled, "FRAME AND TRIM RINGS FOR UNDERBED HITCH MOUNTING ASSEMBLY," filed Jun. 13, 2016; which claims priority from U.S. Provisional Patent Application No. 62/174,388, entitled, "FRAME AND TRIM RINGS FOR UNDERBED HITCH MOUNTING ASSEMBLY," filed Jun. 11, 2015 each of which is incorporated by reference herein.

FIELD OF INVENTION

The present invention is generally related to a towing apparatus and, more particularly, to an underbed hitch mounting system. More particularly, this disclosure is directed to an improved structural frame system and trim rings for an underbed hitch mounting system

BACKGROUND

Many vehicles are designed to transport freight, goods, merchandise, personal property, and other such cargo. Often, a hitch assembly is utilized to connect a towed vehicle or trailer to a towing vehicle, such as a truck for example, to increase the capacity to transport goods. Many types of coupling devices have been developed for providing this connection between a towing vehicle and a towed vehicle.

It is well known to utilize a trailer hitch to connect a trailer to a towing vehicle. There are many different types of trailer hitches that may be attached to the towing vehicle in a variety of ways, depending on the type of hitch to be used. Some of the most common types of hitches include gooseneck, fifth wheel, front mount, and the like. Often, the type of hitch used to connect a trailer and a vehicle is determined by the size, shape and other features of the trailer. For example, large trailers such as semi trailers and campers often require a fifth wheel hitch, whereas, small and mid-sized trailers, such as boat trailers, are better suited for gooseneck trailer hitches. Typically, trailers are connected to a towing vehicle by way of a ball hitch secured to the vehicle and a ball socket coupling mechanism on the trailer that mounts over the ball and thereby allows for the trailer to pivot behind the towing vehicle.

Due to the size and weight of many trailers, towing a trailer may cause unsafe conditions for the towing vehicle, such as fishtailing or other unsafe effects. To avoid these unwanted effects, it is preferable to evenly balance and distribute the weight of the trailer over the wheels of the towing vehicle. This is best accomplished by connecting the hitch to the frame or base of the towing vehicle, near the vehicle's center of gravity. Accordingly, fifth wheel and gooseneck hitches mounted to pickup trucks are often connected to the truck frame underneath the bed of the truck.

Traditional fifth wheel hitches include a head assembly for receiving a king pin on a trailer, a base having a plurality of legs, and one or more mounting rails. The mounting rails may be permanently fixed to the frame of a vehicle, such as a pickup truck. For example, the mounting rails may be connected between two portions of a pickup truck frame underneath the truck bed. The mounting rails may include a plurality of holes for receiving the legs of the fifth wheel hitch.

Corresponding openings may be cut in the truck bed and aligned with the holes in the mounting rails. The legs of the fifth wheel hitch may be connected to holes in the mounting rails through the openings in the truck bed, thereby securing the fifth wheel hitch to the frame of the truck. When the fifth wheel hitch is not in use, the legs may be disconnected from the holes in the rails and the hitch may be removed from the bed of the truck. Caps may be placed over the holes to allow the truck bed to be used for other purposes.

Traditional gooseneck hitches also mount to a pickup truck frame, beneath the bed of a truck. A gooseneck hitch is designed for use in a pickup truck similar to a fifth wheel. The difference is that the gooseneck uses a ball and coupler verses a kingpin and pin receiver. Gooseneck hitches include a mounting plate configured to connect to the frame of a truck, a receptacle in the mounting plate configured to receive a ball hitch, and a hitch ball removably connected to the receptacle and configured to engage a coupling member of the trailer. An opening in the bed of the truck is aligned with the receptacle in the mounting plate, allowing the hitch ball to connect to the receptacle through the opening in the truck bed. The hitch balls themselves are typically removable or retractable so that when the hitch is not in use, the hitch ball may be removed or retracted when not in use, so as not to obstruct the bed of the pick-up truck in any significant manner.

Towing vehicles are generally arranged to accommodate either a fifth wheel hitch or a gooseneck hitch, but not both. To convert a towing vehicle from accommodating a fifth wheel hitch to a gooseneck hitch or vice versa is time and labor intensive and inefficient. Furthermore, both fifth wheel hitches and gooseneck hitches are preferably mounted to the vehicle frame near the vehicle's center of gravity. However, since fifth wheel hitches and gooseneck hitches use different mounting configurations, traditionally only one hitch can occupy this location.

Some underbed structural bodies are made by components that increase time to market and have higher tooling costs. Additionally, some vehicles, such as light duty trucks that may not be equipped with a frame configured for a $5^{th}$ wheel hitch or gooseneck attachment may not be easily configured to receive support frame components as the layout of the available vehicle structure may not allow for particular strength of configured components. Known designs are described by U.S. Pat. Nos. 7,793,968 and 7,828,317. Further, examples of these designs may be found in commonly owned patents including U.S. patent application Ser. No. 14/739,076, entitled, "UNDERBED HITCH MOUNTING SYSTEM," filed Jun. 15, 2015 which is a continuation of U.S. patent application Ser. No. 13/790,134, entitled "UNDERBED HITCH MOUNTING SYSTEM," filed Mar. 8, 2013, now U.S. Pat. No. 9,067,468 which is a continuation of U.S. patent application Ser. No. 12/609,062, entitled "UNDERBED HITCH MOUNTING SYSTEM," filed Oct. 30, 2009, now U.S. Pat. No. 8,414,009 which claims benefit from U.S. Provisional Patent Application No. 61/197,732, entitled "UNDERBED HITCH MOUNTING SYSTEM," filed on Oct. 30, 2008, which are all hereby incorporated in their entirety by reference.

These patents describe "H" frame structures with integrated castings and safety chain/$5^{th}$ wheel pucks. The casting designs are either with an integrated safety chain/$5^{th}$ wheel mounting system or are separate from the castings along with the use of square or rectangular shaped tube mill standard tubing to connect the center gooseneck with the four safety chain mounts. These castings are usually expensive and have a long lead time for tooling.

Therefore, there is a need in the art for an improved apparatus for towing vehicles that allow for selectively accommodating either a fifth wheel hitch or a gooseneck hitch that reduces cost and time for manufacturing.

Further, underbed structural frames may be exposed to the bed portion of a vehicle. The configuration of the bed liner or contours of the vehicle bed may hamper bed usage by damaging cargo.

Therefore, the disclosed embodiments may solve the problems of the prior art and includes an assembly that may selectively cover exposed portions of the underbed structural frames.

SUMMARY

An underbed hitch mounting system capable of being connected to a vehicle frame is described. The mounting system may be utilized for towing vehicles wherein the mounting system may selectively accommodate either a fifth wheel hitch or a gooseneck hitch. The mounting system may be an apparatus for attaching either a fifth wheel trailer hitch or a gooseneck trailer hitch to a bed of a vehicle.

The underbed hitch mounting system comprises a structural frame member operably connectable to a frame of a vehicle under a load bed of the vehicle. The structural frame member includes a first rail and a second rail mount. Each rail mount having a pair of rail members extending therefrom and inserted into the first and second rail mounts. A mid rail connected to the first and second rail mounts. A socket positioned on each of the rail members, each socket engageable with a receiving member. A hitch ball socket positioned on the mid rail, the hitch ball socket engageable with a hitch. The rail members may be made from at least one of bar stock, welded tubing and sheet metal. The rail mounts may have a generally rectangular cross section and the mid rail may have a generally C-shaped cross section that extends between the rail mounts. The mid rail and first and second rail mounts are monolithically formed. A base plate may extend under the mid rail and may extend along at least a portion of the first and second rail mounts. The first and second rail mounts may be generally C-shaped frame members and the base plate may be a generally C-shaped frame member that extends under the mid rail and under and within the first and second rail mounts. The mid rail and first and second rail mounts may include a top portion that is generally monolithically formed and a bottom portion that is generally monolithically formed wherein the top portion is formed separate from the bottom portion and then attached to the bottom portion. The top and bottom portions may be made of folded sheet metal and may include a base plate that extends under and within the mid rail and under a portion of the first and second rail mounts.

In one embodiment, provided is a trim and cover assembly to used with the underbed hitch mounting system. the trim and cover assembly comprises a trim member and a cover member that is selectively attached to the trim member. The trim and cover member may be installed along the load bed of a vehicle to cover at least one of the socket and hitch ball socket of the underbed hitch mounting system.

In another embodiment, provided is a trim and cover assembly to be installed along a bed of a vehicle comprises a trim member and a cover member that is selectively attached to the trim member. The trim member may be attached to a corrugated portion of the bed of the vehicle. The trim may include a trim profile and the cover member may include a cover profile wherein the trim profile and the cover profile are complimentary to a corrugated profile of the bed of the vehicle. The trim member include an upper flange, wherein a portion of the upper flange may be positioned along a top surface of the bed and a lower flange wherein a portion of the lower flange may be positioned along a bottom surface of the bed. The flange may include a space between the upper flange and the lower flange. The trim member may include a recessed wall having a first height along a first portion of the perimeter and a second height along a second portion of the perimeter such that the second height is greater than the first height. Further, space between the upper flange and the lower flange may be positioned along the recessed wall along the portion with the second height. The trim member may include a recessed wall having a first height along a first portion of the perimeter and a second height along a second portion of the perimeter such that the second height is greater than the first height. The trim member may be snap fit within an opening in the bed of the vehicle. The cover may be snap fit to the trim member. The trim member may include an aperture to receive at least one of the socket and hitch socket. A center portion of the trim member may be raised to follow the contours of the bed. The trim member and cover may include generally symmetrical profiles. The trim member may include a flap portion that extends between a plurality of raised portions of the bed of the vehicle.

In one embodiment, provided is an underbed hitch mounting system that comprises a structural frame member operably connectable to a frame of a vehicle under a load bed of the vehicle. The structural frame member comprises a first rail mount and a second rail mount. A first rail member and a second rail member may extend from and be inserted into the first rail mount. A mid rail may be connected to the first and second rail mounts. A socket may be positioned on each of the first and second rail members, each socket engageable with a receiving member. A hitch ball socket may be positioned on the mid rail, the hitch ball socket engageable with a hitch wherein the first and second rail members may be made from at least one of bar stock and sheet metal.

DESCRIPTION OF THE DRAWINGS

Objects and advantages together with the operation of the invention may be better understood by reference to the following detailed description taken in connection with the following illustrations, wherein.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined, switched, or altered without departing from the scope of the present teachings, e.g., features of each embodiment disclosed herein may be combined, switched, or replaced with features of the other embodiments disclosed herein. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Figure 9:
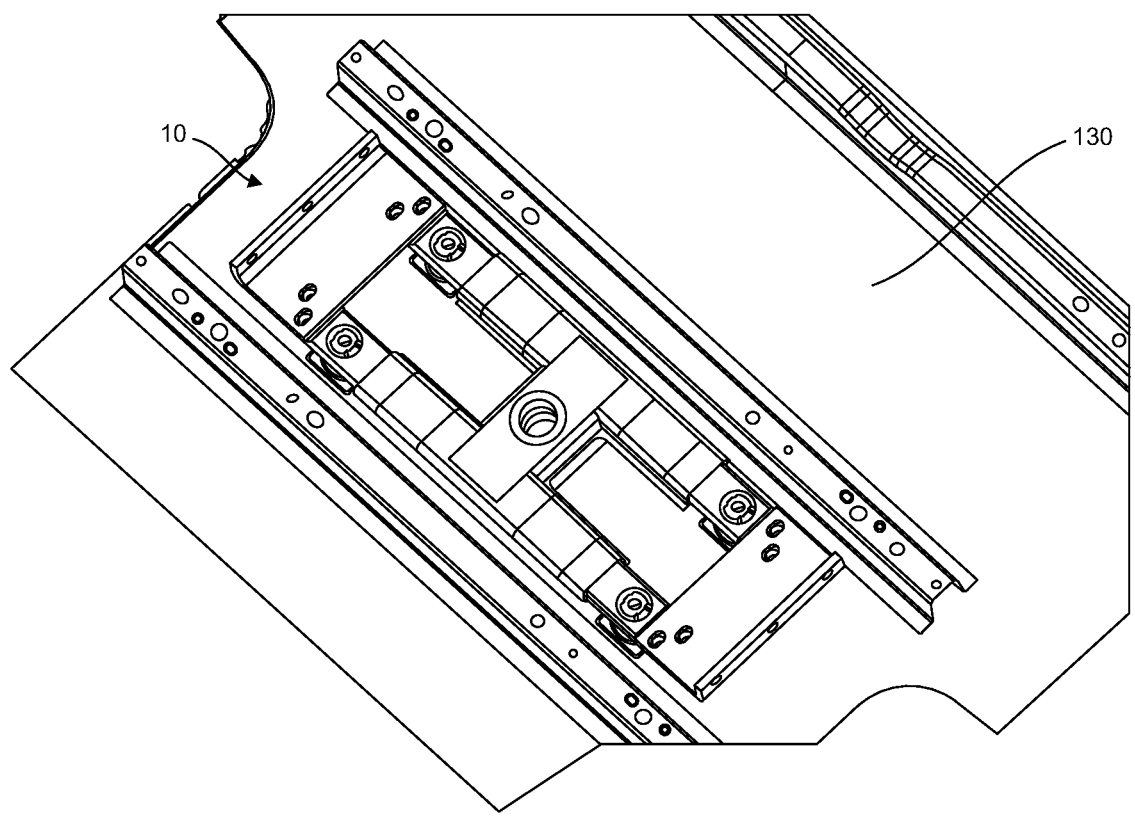
FIG. 9 illustrates a perspective view of the structural frame of the underbed hitch mounting system attached to the underside of a vehicle bed.

FIGS. 1A, 1B, 1C, 2A, 2B, 2C, 3A, 3B, and 3C illustrate embodiments for a structural frame member 20 for an underbed hitch mounting system 10. The underbed hitch mounting system 10 may be used with towing vehicles that allow for selectively accommodating either a fifth wheel hitch or a gooseneck hitch. Trailer hitches, such as a gooseneck or fifth wheel hitches may be mounted to a truck bed. These types of hitches are often mounted beneath the truck bed (see FIG. 9) in conjunction with the truck's own frame rails (See FIG. 6), such as with cross members or rails, for example.

The underbed hitch mounting system 10 may include at least one rail mount or cross member 30 and at least one mid rail or adapter plate 40. For example, the mounting system 10 may include two rail mounts 30 and one mid rail or adapter plate 40. The rails 20 may be configured to support a gooseneck hitch or a fifth wheel hitch (not shown). Typical fifth wheel hitches may include a plurality of legs to connect the hitch to a vehicle. While the underbed hitch mounting system 10 may be shown and described as having two rail mounts 30 and one mid rail or adapter plate 40, it is to be understood that there may be any appropriate number of rails or adapter plates and it should not be limited to that shown and described herein.

The rail mounts 30 may be of any appropriate shape or size, such as a generally tubular, square or rectangular shape. Each rail mount 30 may be attached to a rail member 32 which may include one or more sockets 34 (See FIG. 7). The sockets 34 may be of any appropriate shaper or size, such as a generally ovular, circular or rectangular shape. The sockets 34 may be configured to receive and support the legs of a fifth wheel hitch. The legs may be secured to the rails 32 through the sockets 34 by any appropriate means, such as by fasteners, being welded, or the like.

Figure 7:
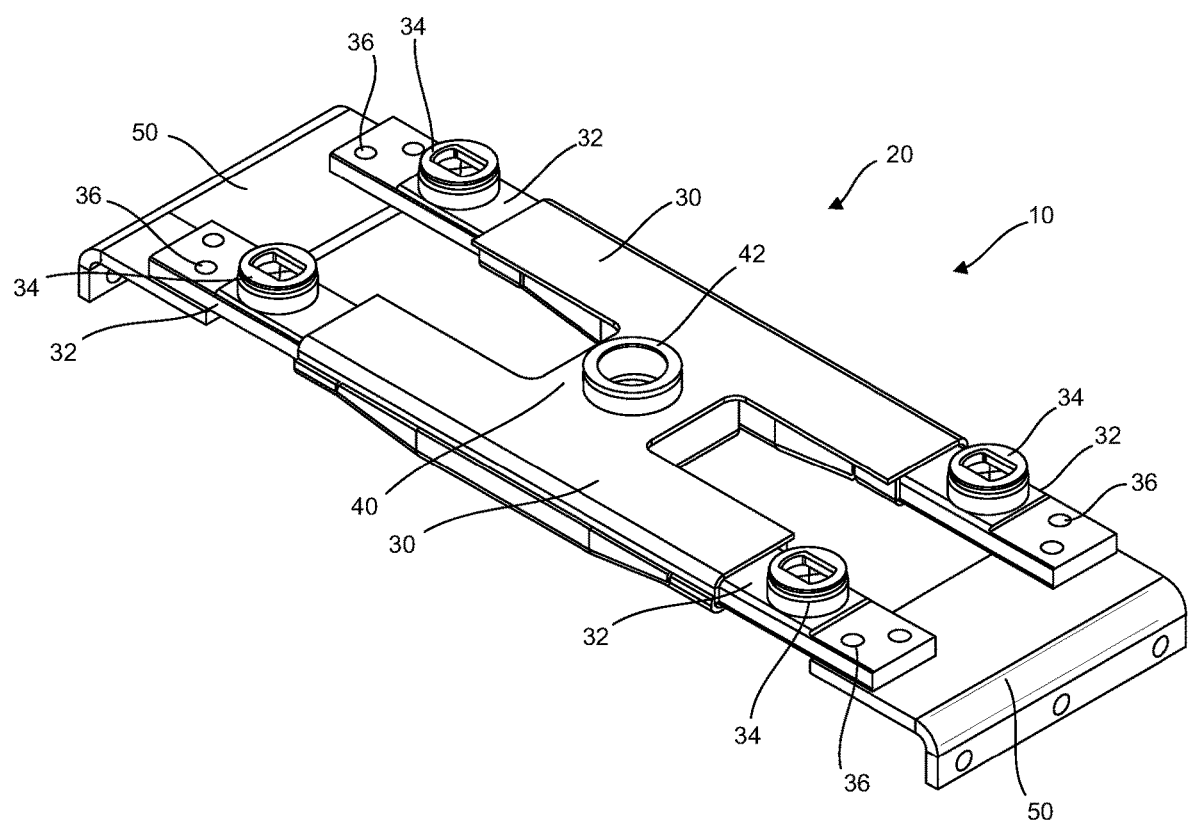
FIG. 7 illustrates a perspective view of embodiments of the underbed hitch mounting system of the present invention.

The rails 32 may include connecting holes or mounting apertures 36 (FIG. 7). The mounting apertures 36 may be of any appropriate shape or size, such as a generally circular, ovular or rectangular shape. There may be any number of appropriate mounting apertures 36 and should not be limited to that shown and described herein.

Figure 8A:
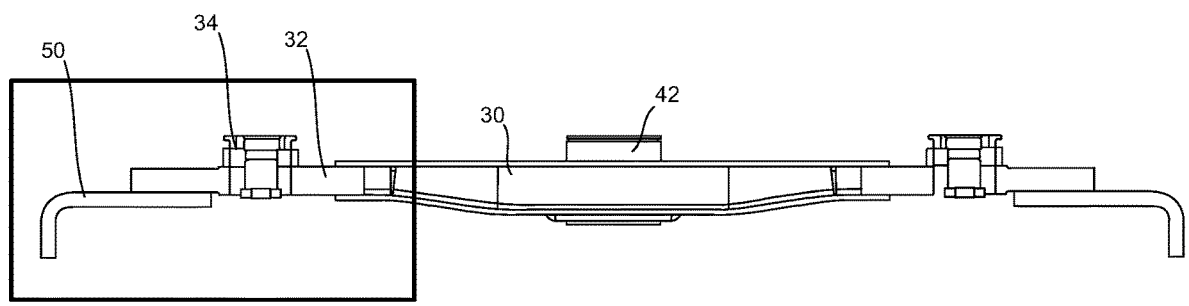
FIG. 8A illustrates a side cross sectional view of an embodiment of the structural frame of the underbed hitch mounting system of the present invention.
Figure 8B:
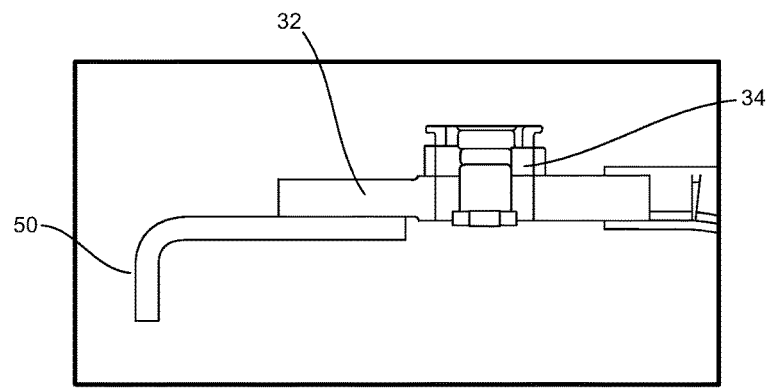
FIG. 8B illustrates a side cross sectional view of a portion of FIG. 8A.

The mounting apertures 36 may be utilized for connecting another member to the rails 32, such as the frame mount brackets 50 (see FIGS. 7, 8A and 8B). The mounting apertures 36 may also be used to connect the rails 32 of the hitch mounting system 10 to the underbed of the towing vehicle frame. For example, the rails 32 may be connected to the towing vehicle frame, such as underneath the truck bed (FIG. 7).

The rails 32 may include one or more frame mount brackets 50 (FIGS. 4, 5, 6, and 7). The frame mount brackets 50 may be utilized for connecting the rails 32 to the frame 52. The rails 32 may be connected to the frame mount brackets 50 by any appropriate means, such as with fasteners, welding or the like. The frame mount brackets 50 may be of any appropriate shape or size, such as a general L-shape, rectangular plate or the like. The frame mount brackets 50 may be sized and shaped to engage a vehicle frame.

Figure 6:
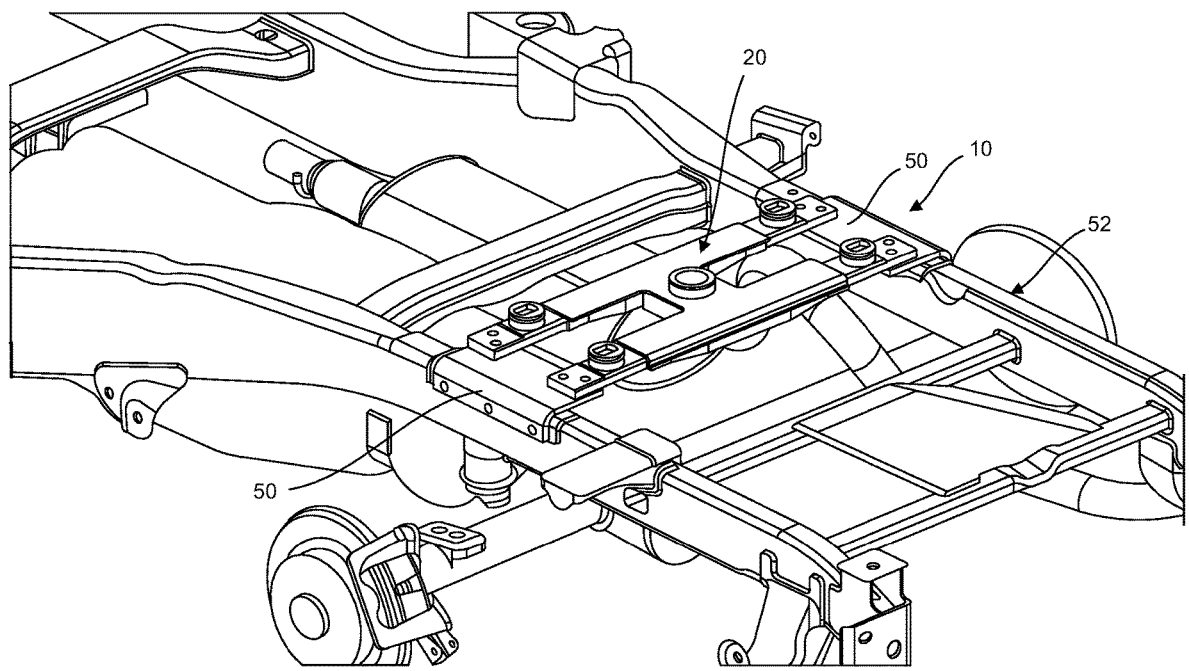
FIG. 6 illustrates a perspective view of embodiments of an underbed hitch mounting system mounted to a frame of a vehicle.

Typical vehicle frames 52 may include two parallel steel members (FIG. 6). An end of the structural frame member 20 may connect to a first member of the frame 52 and an opposite end of the structural frame member 20 may connect to a second member of the vehicle frame 52. The rail mounts 30 and rails 32 may extend between the frame mount brackets 50. The rail mounts 30 and rails 32 may be of a length sufficient to span the distance between the frame mount brackets 50 when those brackets engage the vehicle framework 52. The frame mount brackets 50 may form a generally L-shaped bracket to engage the frame 52. The frame mount brackets 50 may be attached to the frame 52 by any appropriate means, such as with fasteners, welding or the like.

Figure 1A:
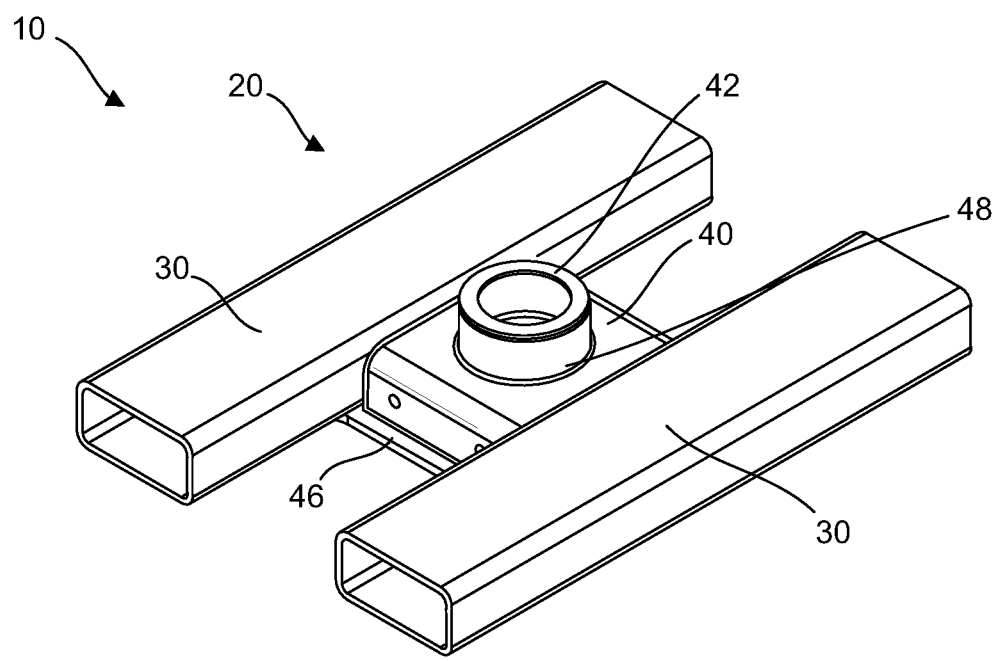
FIG. 1A illustrates a top perspective view of a structural frame of an underbed hitch mounting system in a embodiment of the invention.

The mid rail or adapter plate 40 may be of any appropriate shape or size, such as a generally rectangular or tubular shape that may span the length between the rail mounts 30 (FIGS. 1A-C4). The mid rail or adapter plate 40 may be configured to connect to the rail mounts 30. The mid rail or adapter plate 40 may be attached to the rails by any appropriate means, such as with fasteners, welding or the like. Additionally, the adapter plate 40 may be a generally continuous and uniform monolithic construction with the rail mounts 30.

The adapter plate 40 may be of a one piece construction or may include several sections that may be secured together by welding, fasteners or the like. When the mid rail 40 is connected to the rail mounts 30, the rail mounts 30 may be approximately flush with and parallel to one another.

Figure 1B:
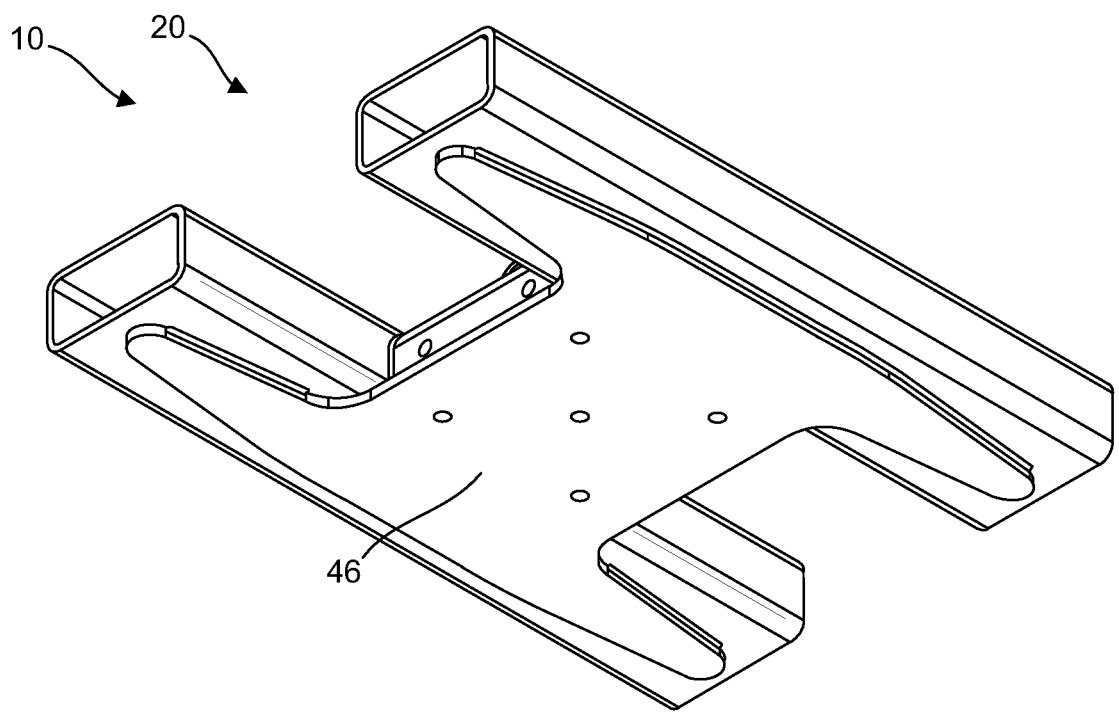
FIG. 1B illustrates a bottom perspective view of the structural frame of the underbed hitch mounting system of FIG. 1A.

The mid rail 40 may also include a base member 46. The base member 46 may be of any appropriate shape or size, such as a generally square, rectangular or tubular shape. The base member 46 may be a plate and may be attached to the bottom of the mid rail 40. The base member 46 may be attached to the mid rail 40 by any appropriate means, such as by welding, fasteners or the like. The base member 46 may also be secured to the rail mounts 30, such as on the underside of the rail mounts 30 (FIG. 1B). In one embodiment, the base member 46 may have a continuous H type shape having portions that extend along the bottom of the rail mounts 30 and a portion that extends along the bottom of the mid rail 40. The base member 46 may have a shape that extends passed the edges of the bottom of the mid rail 40 as illustrated by FIG. 1B.

The mid rail 40 may include a receiver 42 that may be configured to receive a hitch ball. For example, the receiver may be a hitch ball socket that may be configured to receive the hitch ball. The hitch ball socket 42 may be of any appropriate shape or size, such as a generally cylindrical shape. The hitch ball socket 42 may be located at any appropriate position on the adapter plate 40, such as the approximate center of the adapter plate 40. For example, the hitch ball socket 42 may be configured to receive a removable hitch ball with spring-loaded ball bearings. It should be appreciated, however, that the receptacle may be configured to receive any appropriate type of hitch ball and should not be limited to that described herein.

The hitch ball socket 42 may include a raised collar 48. The raised collar 48 may be of any appropriate shape or size, such as one that may extend above and approximately perpendicularly to the surface of the adapter plate 40. The raised collar 48 may protrude through or be accessible through an aperture in the bed of a vehicle.

The underbed hitch mounting system 10 may utilize a puck mounting system whereby the trailer hitch may be installed in the pickup truck bed with only four small holes (not shown). Utilizing a puck mounting system may provide uninhibited use of the truck bed when the hitch is dismounted. The puck mounting system may also provide for a wider platform and mounting surface, which increases the stability. The puck mounting system may be used with any appropriate trailer hitch mounting kit, such as those that utilize rail mounts 30 or cross members for example, such as with the "Signature Series" produced and sold by Cequent.

The underbed hitch mounting system 10 may include at least two rail mounts or cross members 30. The cross members 30 may include rails 32 and sockets 34 for attachment with a puck or receiving member. The cross members 30 may be attached to the vehicle framework 52 by any appropriate means, such as with fasteners, by welding or the like.

Holes may be drilled in the truck bed corresponding to the locations of the sockets 34 in the rails 32 and the hitch ball socket 42. A fifth wheel hitch may be removably connected to the sockets 34 in the rails 32 through the holes located in the truck bed. A hitch ball may be removably connected to the hitch ball socket 42 through the hole in the truck bed, whereby a gooseneck hitch may be utilized.

Figure 1C:
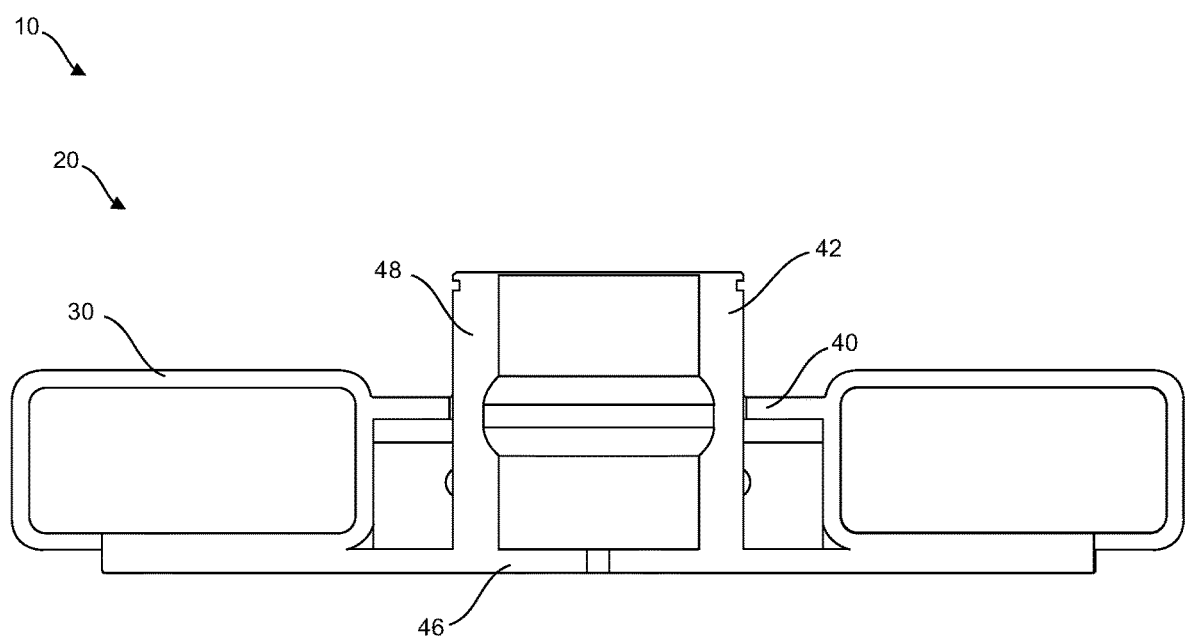
FIG. 1C illustrates a cross sectional view of the structural frame of the underbed hitch mounting system of FIG. 1A.

FIGS. 1A, 1B, and 1C illustrate an embodiment of the underbed hitch mounting system 10. The rail mounts 30 are made from bar stock welded tubing or sheet metal parts. The bar stock may be machined or heat treated. The bar stock material may be used at frame mounting points and fifth wheel attachment areas with welded tubing or sheet metal parts. This may allow the system to meat normal layout constraints of existing vehicle frame configurations but also meat strength requirements for connection to the frame and support for the appropriate fifth wheel hitch or gooseneck assembly. Further, the use of bar stock and press broken sheet metal allows for a quick production lead time and lower tooling costs. In one embodiment, the rail mounts 30 and mid rail 40 are made of sheet metal material and the rail members 32 are made of a solid bar stock material that has been heat treated and machined.

The rail mounts may have a generally rectangular cross section and the mid rail 40 has a C-shaped cross section and extends between the rail mounts 30. The base plate 46 extends under the mid rail 40 and extends along at least a portion of the lengths of the rail mounts 30.

Figure 2A:
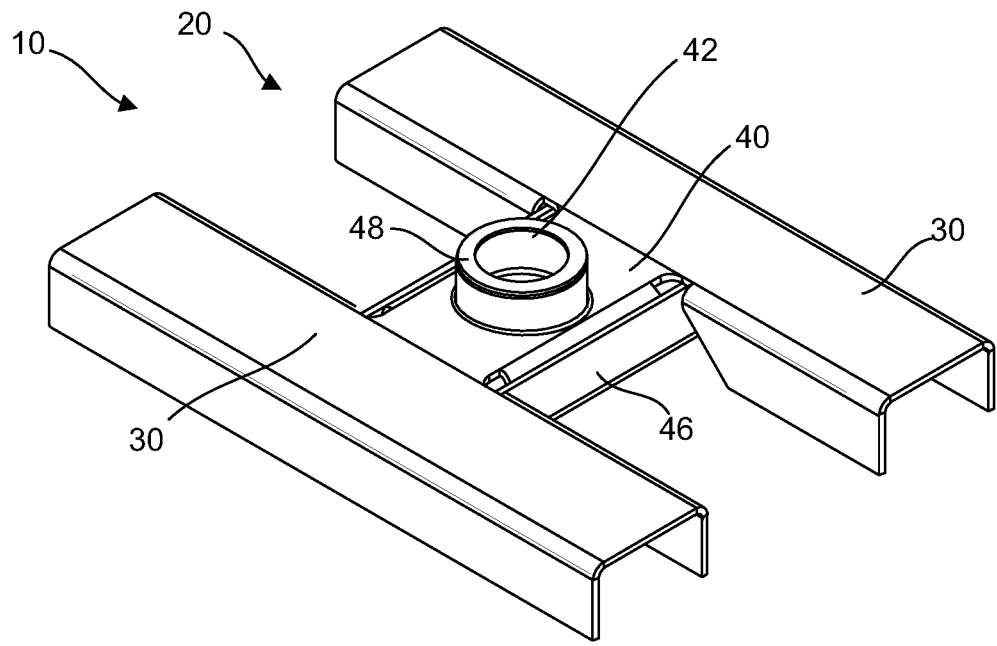
FIG. 2A illustrates a top perspective view of a structural frame of an underbed hitch mounting system in a embodiment of the invention.
Figure 2B:
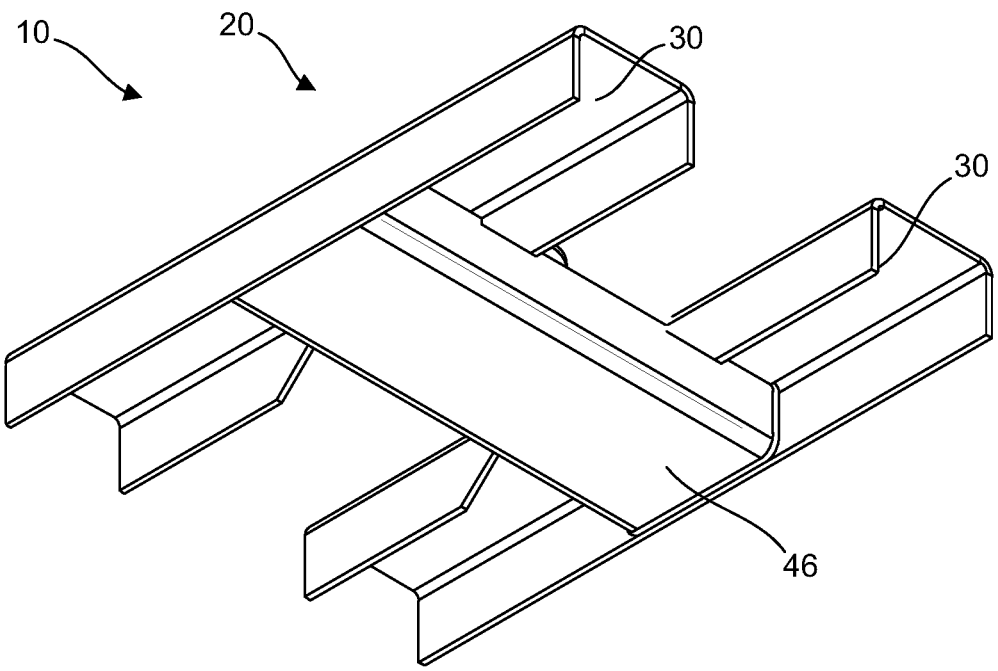
FIG. 2B illustrates a bottom perspective view of the structural frame of the underbed hitch mounting system of FIG. 2A.
Figure 2C:
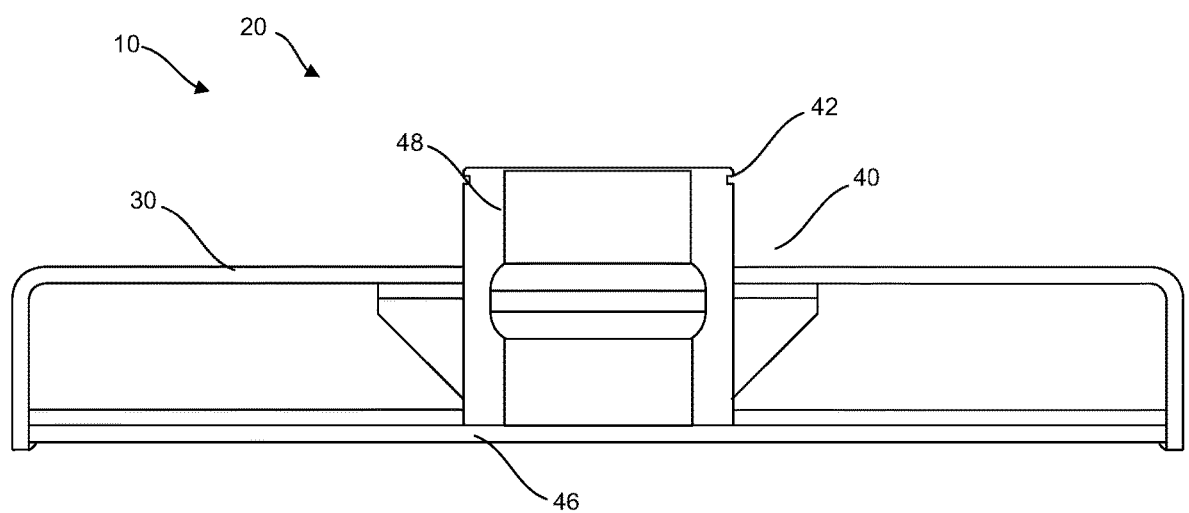
FIG. 2C illustrates a cross sectional view of the structural frame of the underbed hitch mounting system of FIG. 2A.

FIGS. 2A, 2B, and 2C illustrate another embodiment of the underbed hitch mounting system 10. The mid rail 40 and rail mounts 30 are generally monolithically formed. The rail mounts 30 may be made of folded sheet metal and formed into generally C-shaped frame members wherein the base plate 46 may be a tube steel or C-shaped frame that extends under the mid rail 40 and under and within the rail mounts 30.

Figure 3A:
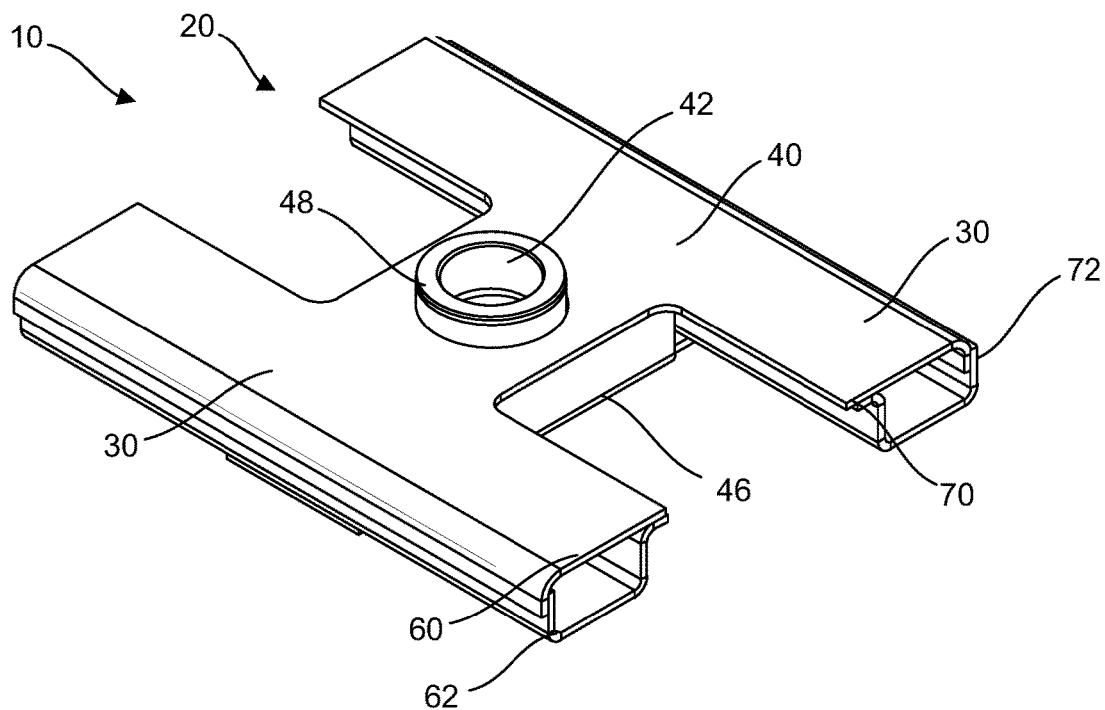
FIG. 3A illustrates a top perspective view of a structural frame of an underbed hitch mounting system in a embodiment of the invention.
Figure 3B:
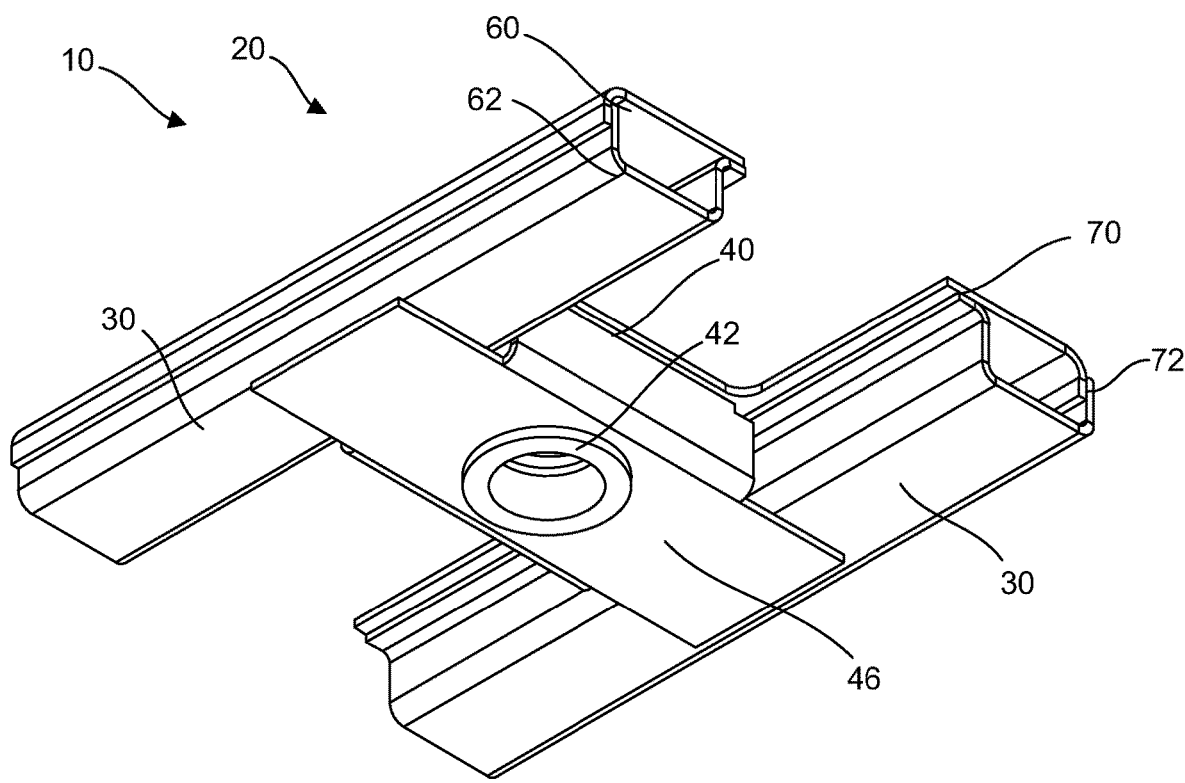
FIG. 3B illustrates a bottom perspective view of the structural frame of the underbed hitch mounting system of FIG. 3A.
Figure 3C:
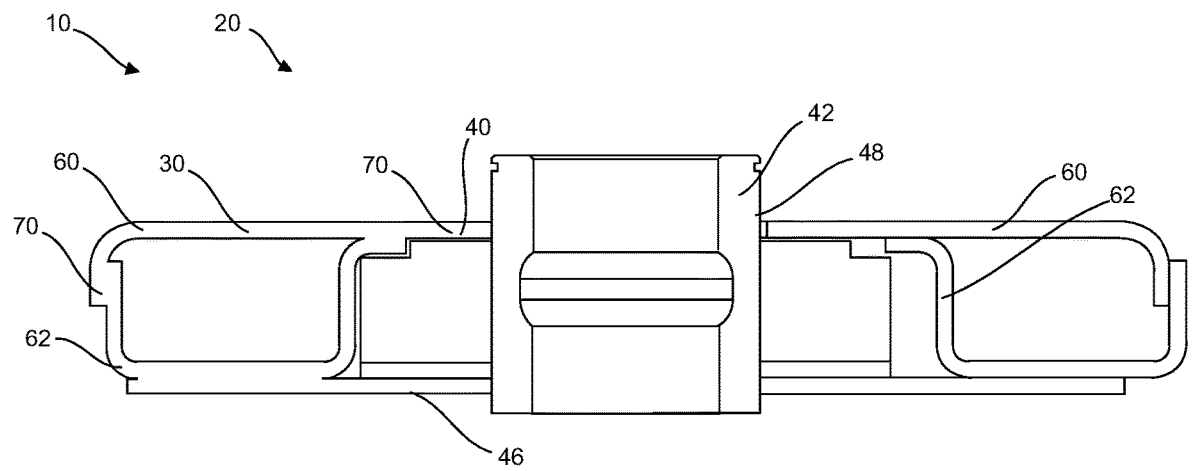
FIG. 3C illustrates a cross sectional view of the structural frame of the underbed hitch mounting system of FIG. 3A.
Figure 4A:
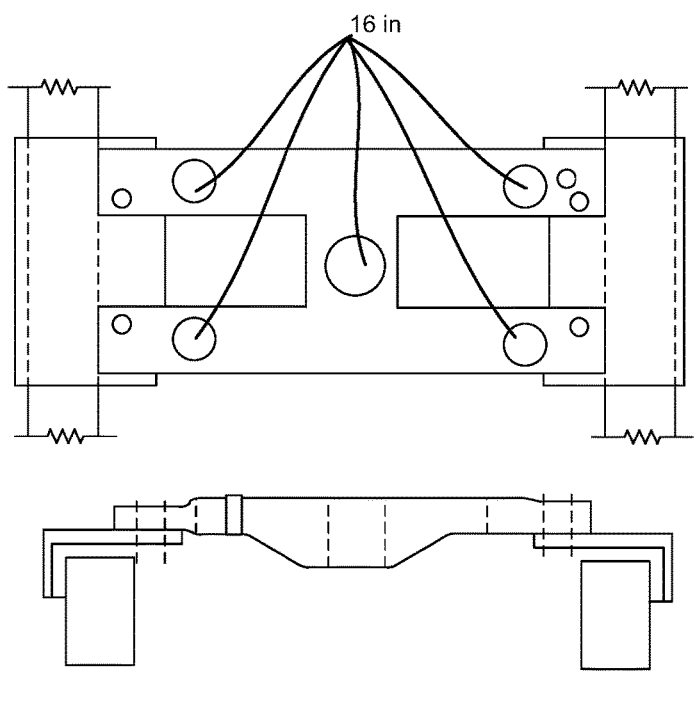
FIG. 4A illustrates a side view of an embodiment of the structural frame of the underbed hitch mounting system of the present invention.
Figure 4B:
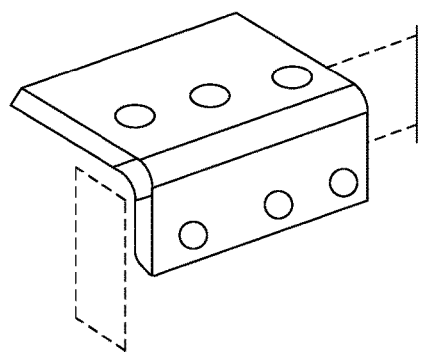
FIG. 4B illustrates a perspective view of an embodiment of a frame mount bracket of the structural frame of the underbed hitch mounting system.
Figure 5A:
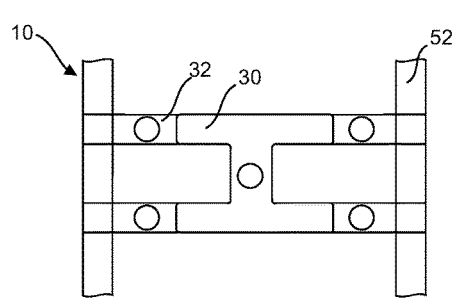
FIGS. 5A, 5B, 5C, 5D, 5E, 5F, 5G, and 5H illustrate various schematic side views of alternate embodiments of the structural frame of the underbed hitch mounting system of the present invention.
Figure 5C:
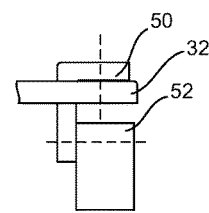
Figure 5D:
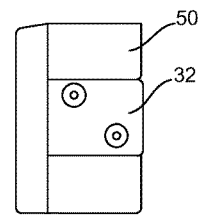
Figure 5E:
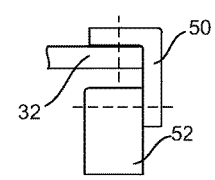
Figure 5B:
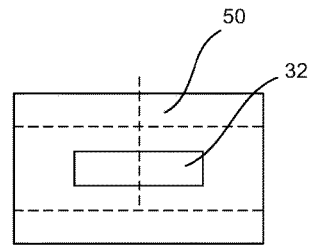
Figure 5F:
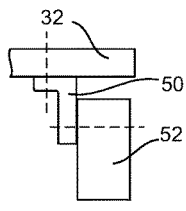
Figure 5G:
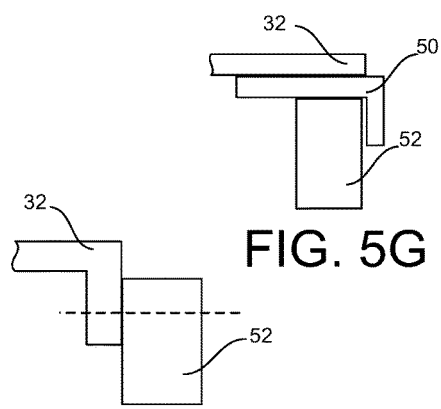
Figure 5H:
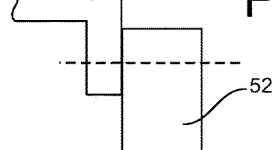

FIGS. 3A, 3B, and 3C illustrate another embodiment of the underbed hitch mounting system 10. The adapter plate 40 and rail mounts 30 include a top portion 60 (FIG. 3C). The top portion 60 may be generally monolithically formed. The top portion 60 may be attached to a bottom portion 62 that is formed into structural tube framing from folded sheet metal. The bottom portion 62 may also be monolithically formed. The bottom portion 62 may be generally monolithically formed separate from the top portion 60. The top and bottom portions 60, 62 may be made of folded sheet metal and formed into frame members wherein the adapter plate 40 and rail mounts 30 may be formed into tube steel framing. The base plate 46 may be a tube steel or C-shaped frame that extends under and within the mid rail 46 and under a portion of the lengths of the rail mounts 30. As illustrated by FIGS. 3A and 3B, the top and bottom portions may be attached together along cantilevered portions 70 that extend from a perimeter of the tube portions of the structural framing member 10 and may be attached together along vertical portions 72 that extend from a perimeter portion of the structural framing member 10. The cantilevered portions 70 may extend generally perpendicular relative to the vertical portions 72 of attachment. The cantilevered portions may extend from a portion of the perimeters of the mid rail 40 and rail mounts 30.

In the embodiments illustrated by the figures, the folded sheet metal may be made of various separately formed pieces of folded sheet metal that may be welded together in a structural framing orientation that may support the forces required by a gooseneck or 5$^{th}$ wheel hitch.

Figure 10:
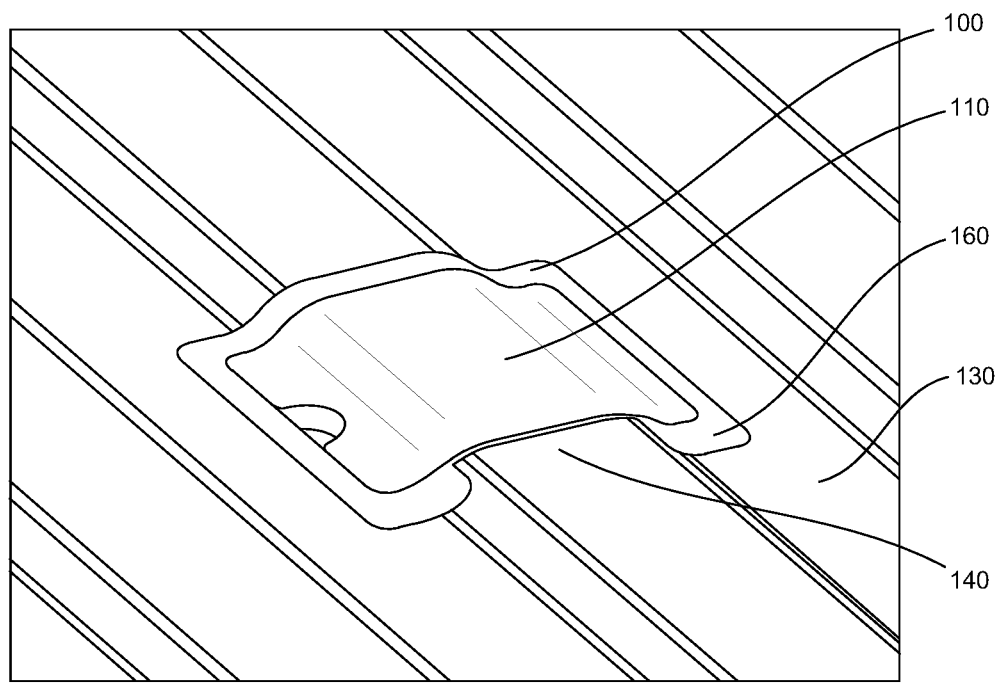
FIG. 10 illustrates a perspective view of embodiments of a trim member and a cover for the underbed hitch mounting system of the present invention.
Figure 11:
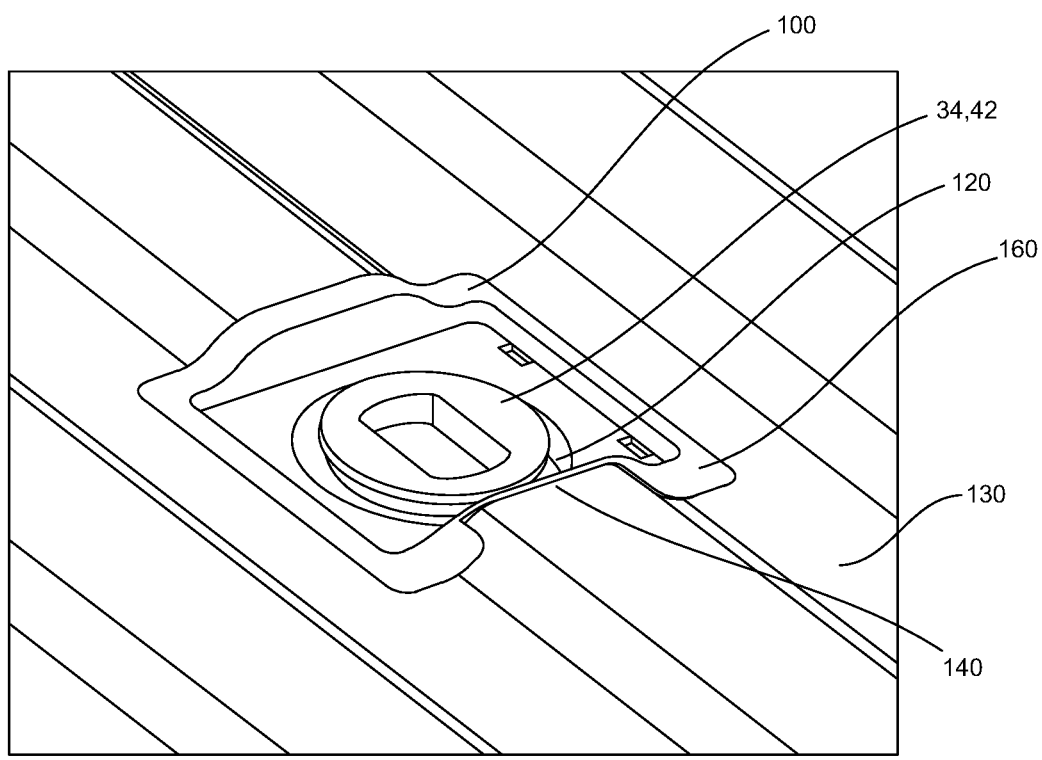
FIG. 11 illustrates a perspective view of embodiments of the trim member for the underbed hitch mounting system of the present invention.
Figure 12:
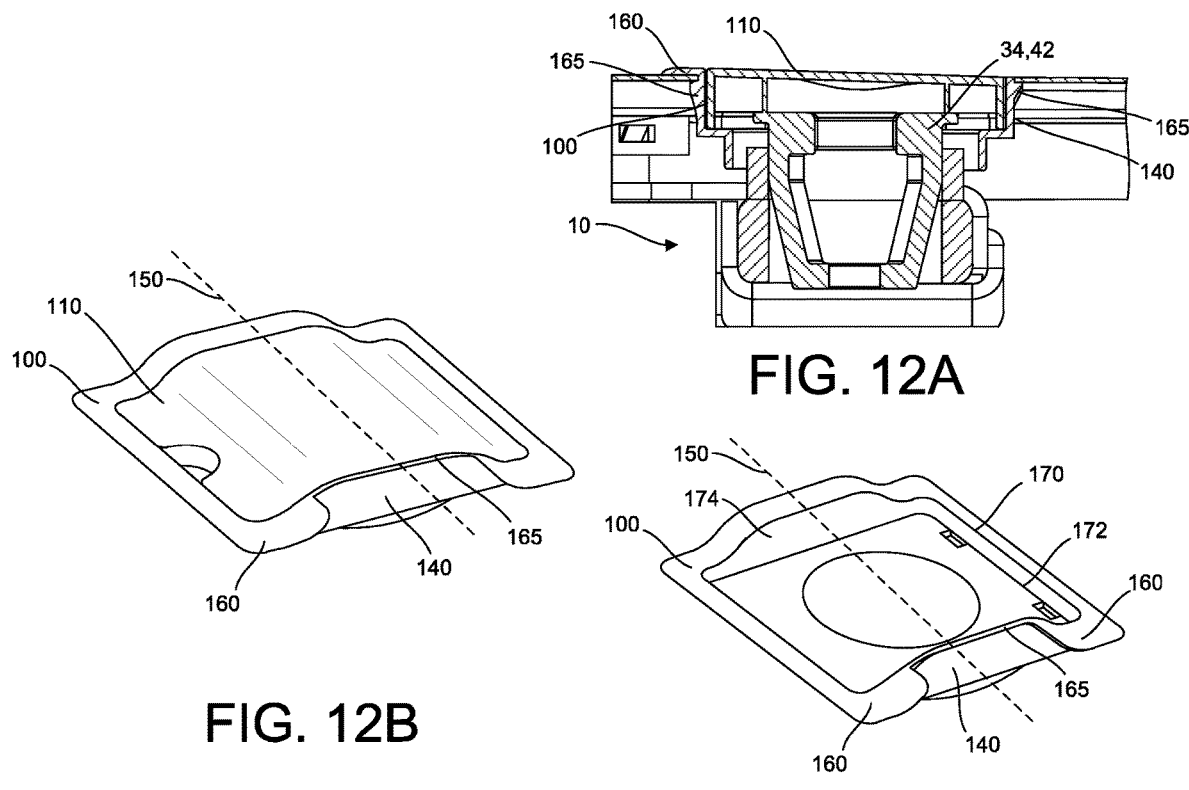
FIG. 12A illustrates a cross sectional view of an embodiment of the trim ring for the underbed hitch mounting system of the present invention.
FIG. 12B illustrates a perspective view of an embodiment of the trim ring for the underbed hitch mounting system of the present invention.
FIG. 12C illustrates a perspective view of an embodiment of the trim ring for the underbed hitch mounting system of the present invention.
Figure 13:
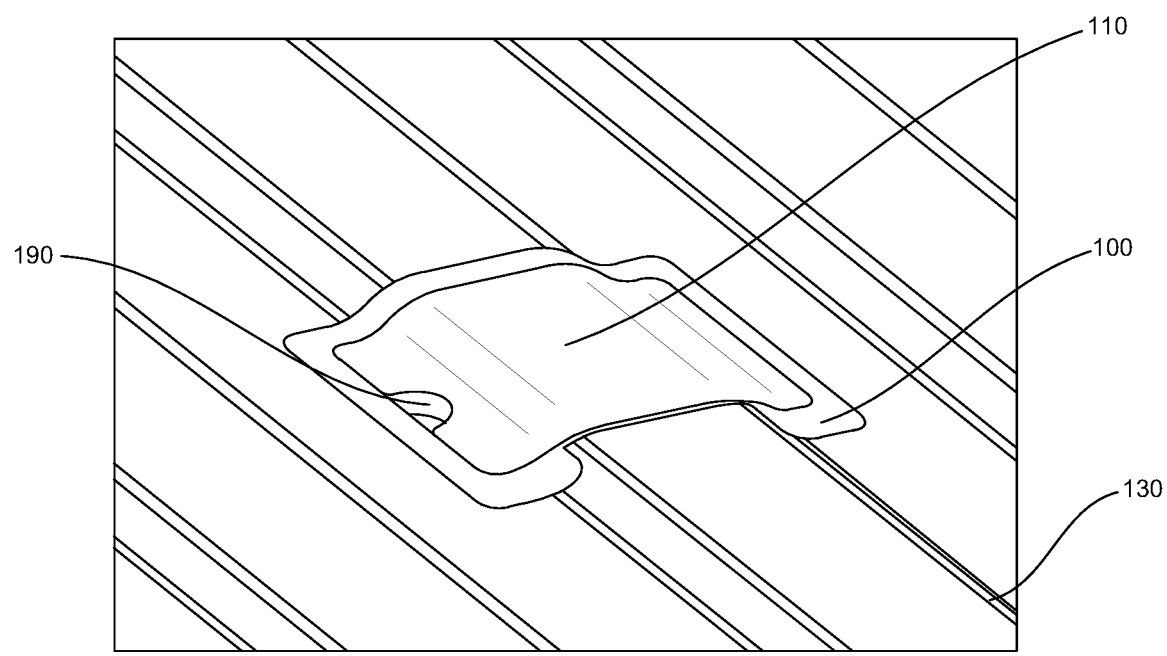
FIG. 13 illustrates a perspective view of embodiments of the trim member and cover for the underbed hitch mounting system of the present invention.
Figure 14:
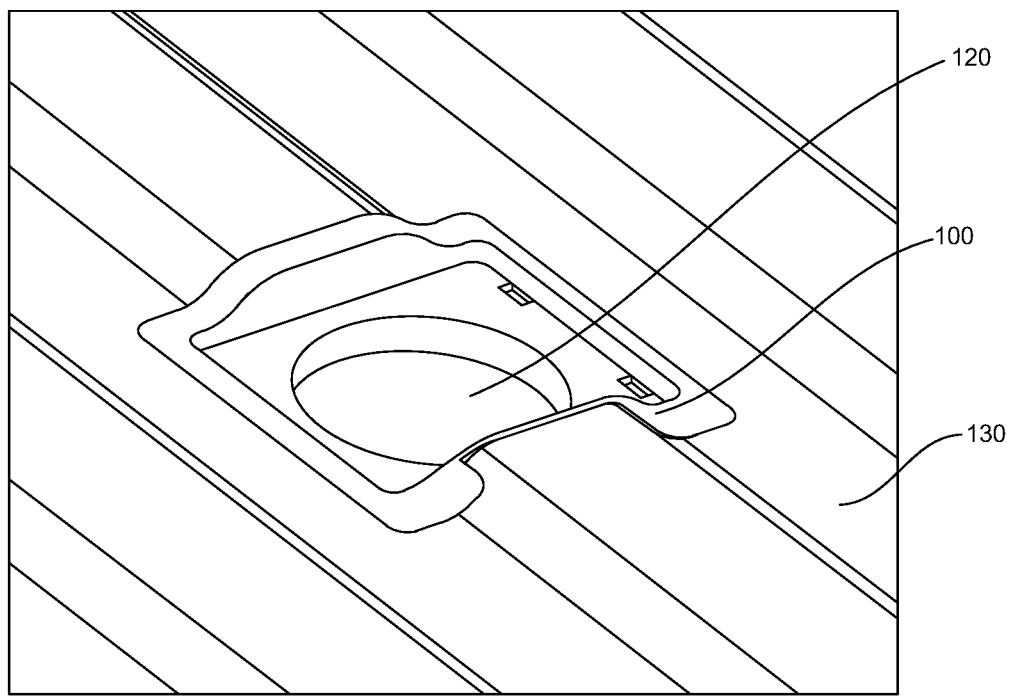
FIG. 14 illustrates a perspective view of embodiments of the trim member for the underbed hitch mounting system of the present invention.
Figure 15A:
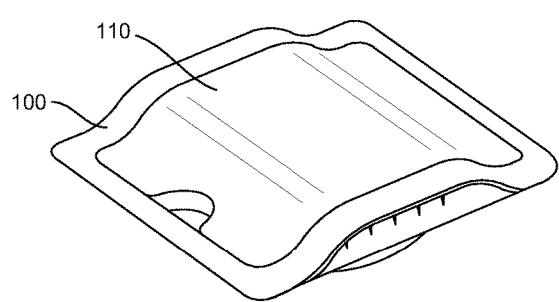
FIG. 15A illustrates a perspective view of embodiments of the trim member for the underbed hitch mounting system of the present invention.
Figure 15B:
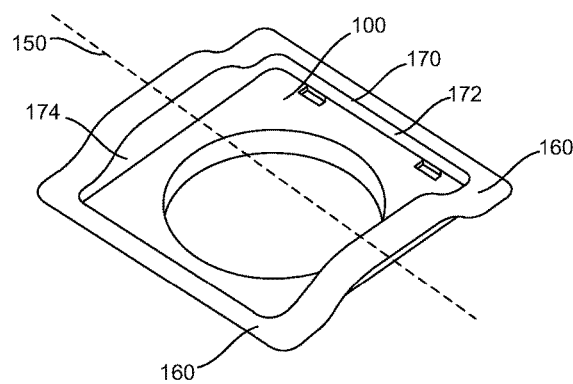
FIG. 15B illustrates a perspective view of embodiments of the trim member for the underbed hitch mounting system of the present invention.
Figure 16A:
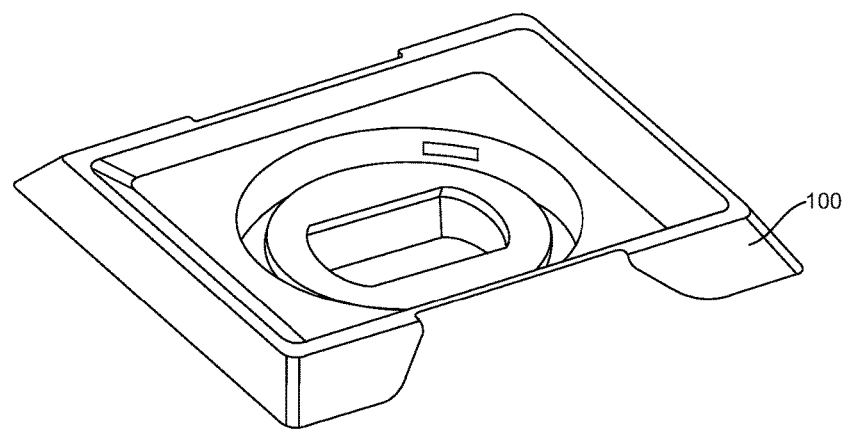
FIG. 16A illustrates a perspective view of embodiments of the trim member for the underbed hitch mounting system of the present invention.
Figure 16B:
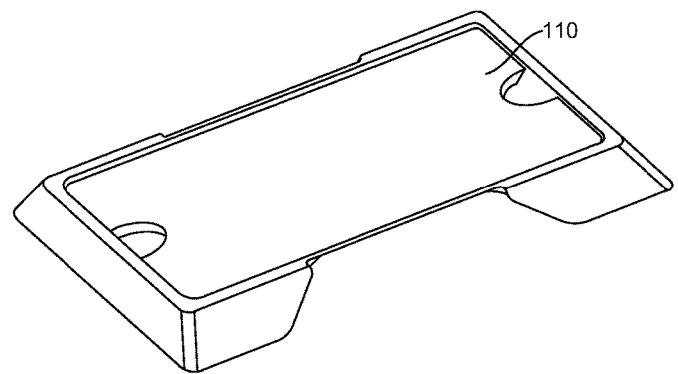
FIG. 16B illustrates a perspective view of embodiments of the trim member for the underbed hitch mounting system of the present invention.
Figures 17A, 17B:
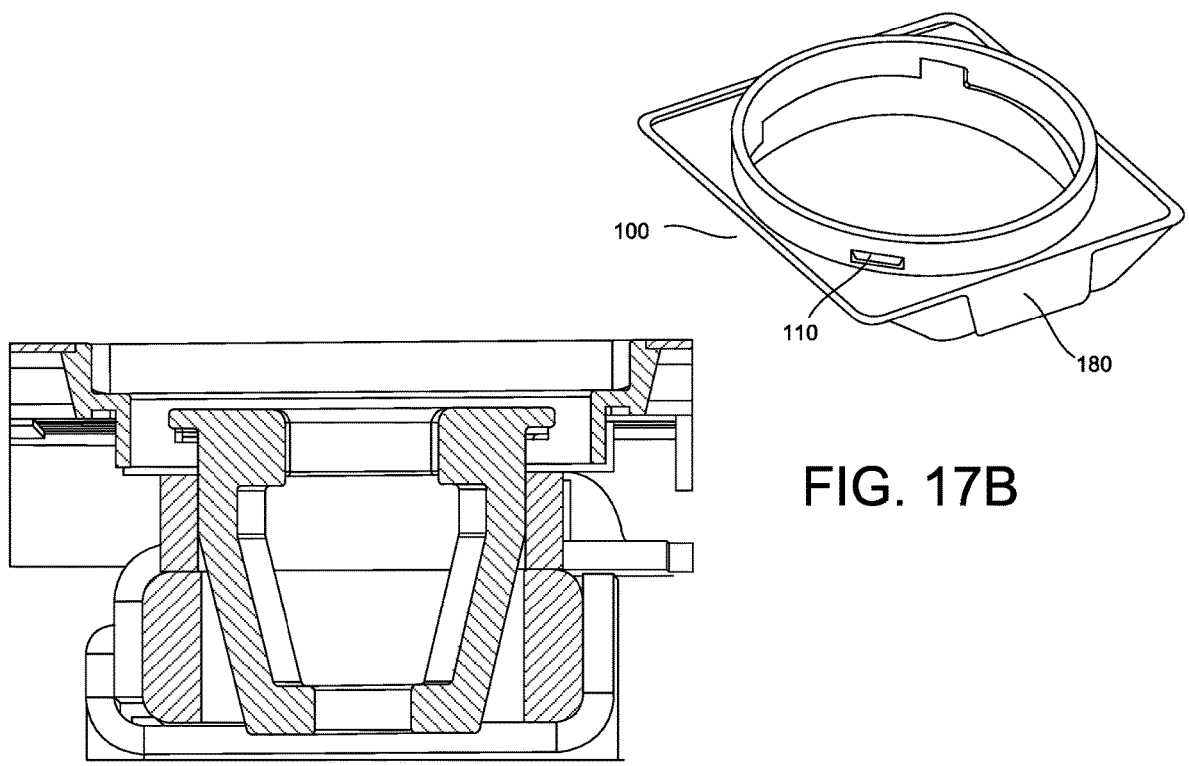
FIG. 17A illustrates a cross sectional view of embodiments of the trim member for the underbed hitch mounting system of the present invention.
FIG. 17B illustrates a perspective view of embodiments of the trim member for the underbed hitch mounting system of the present invention.
Figure 18A:
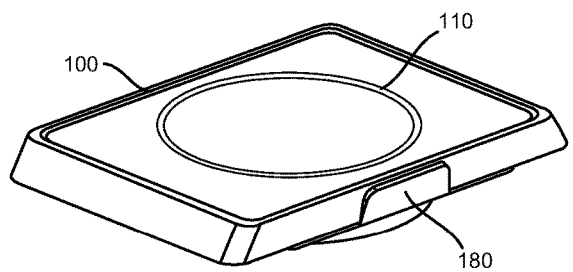
FIG. 18A illustrates a perspective view of embodiments of the trim member for the underbed hitch mounting system of the present invention.
Figure 18B:
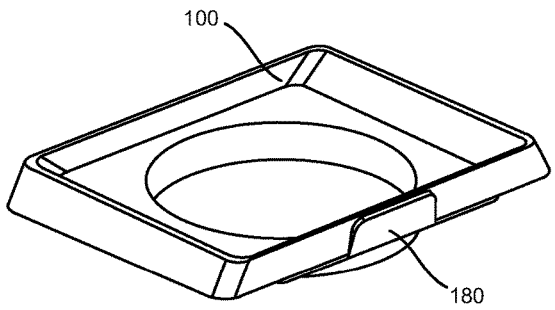
FIG. 18B illustrates a perspective view of embodiments of the trim member for the underbed hitch mounting system of the present invention.
Figure 19A:
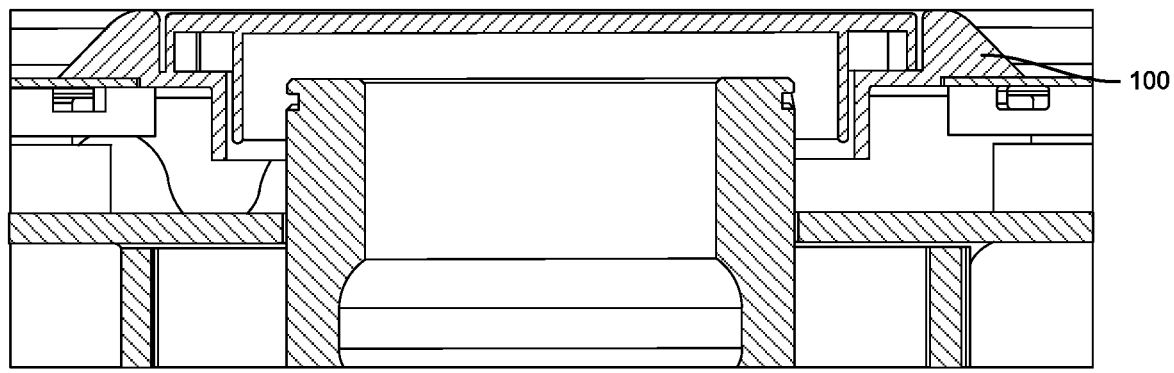
FIG. 19A illustrates a cross sectional view of embodiments of the trim member for the underbed hitch mounting system of the present invention.
Figure 19B:
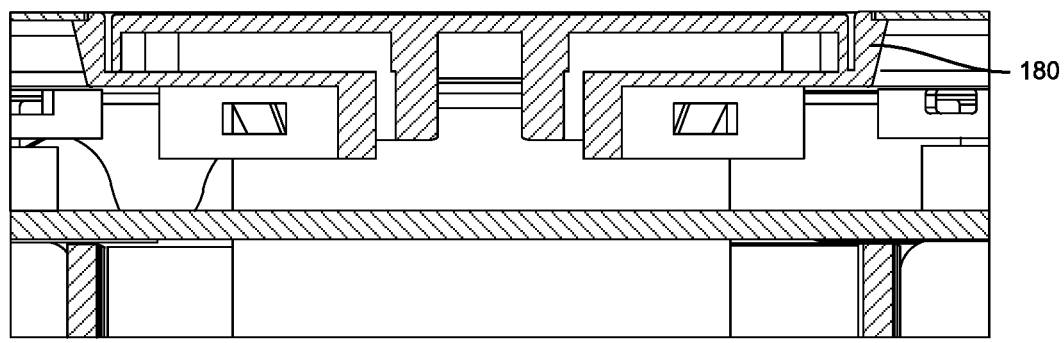
FIG. 19B illustrates a cross sectional view of embodiments of the trim member for the underbed hitch mounting system of the present invention.
Figure 20A:
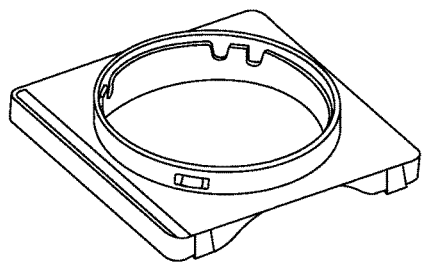
FIG. 20A illustrates a bottom perspective view of embodiments of the trim member for the underbed hitch mounting system of the present invention.
Figure 20C:
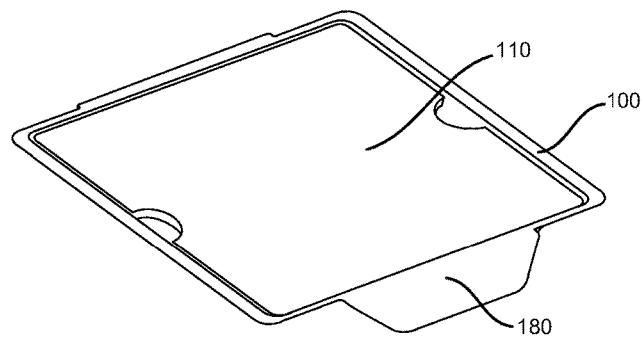
FIG. 20C illustrates a perspective view of embodiments of the trim member for the underbed hitch mounting system of the present invention.
Figure 20B:
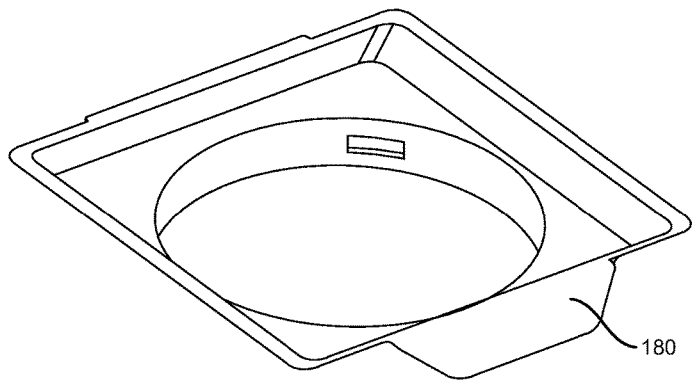
FIG. 20B illustrates a perspective view of embodiments of the trim member for the underbed hitch mounting system of the present invention.

FIGS. 4, 5A, 5B, 5C, 5D, 5E, 5F, 5G, and 5H illustrate various schematic views of alternate embodiments of possible attachments between the structural frame 52 of the vehicle, the rail member 32, and the frame mount brackets 50 of underbed hitch mounting system 10 of the present invention FIGS. 10-23 illustrate various embodiments of trim member and a cover that may be installed along the bed of a vehicle to cover the exposed portions of the underbed hitch mounting system 10. FIG. 10 illustrates a bezel or trim member 100 and a cover 110 attached to a corrugated truck bed 130. The trim member 100 and cover 110 include a profile that is configured to adapt to the corrugated profile of the truck bed and selectively cover the exposed portions of the sockets 34 in the rails 32 and the hitch ball socket 42 of the underbed hitch mounting assembly system 10. The cover 110 may be snap fit to the trim member 100 and the trim member may have an aperture 120 for receiving the sockets 34, 42 therein. The trim member 100 and cover 110 may be made from any materials such as polymers, plastic, rubber or the like. The trim member 100 and cover 110 may be injection molded that follows the shape of the bed 130. The center portion of the trim member 100 may be raised to follow the contours of the corrugated profile of the bed 130 and may includes structural support when attached to the vehicle bed. The trim member 100 and cover 110 may be symmetrical and may cover any edges exposed or cut into the bed of the vehicle. In another embodiment, the trim member 100 may include a trim profile and the cover 110 member may include a cover profile wherein the trim profile and the cover profile may be complimentary to a corrugated profile of the bed of the vehicle. See FIGS. 10-15B.

In one embodiment, as illustrated by FIGS. 12A, 12B, and 12C, the trim member 100 may include a gap 140 within the trim along a center portion 150 to receive a raise portion of the contours of the vehicle bed therein (see FIGS. 10, 11, 12A, 12B, 12C, 16A and 16B). In another embodiment, the trim member 100 may not include a gap 140 (See FIGS. 15A and 15B).

The trim member 100 may include an upper flange 160 the generally surrounds the perimeter of the trim member 100. A portion of the upper flange 160 may be positioned along a top surface of the bed 130. The trim member 100 may include a lower flange 165 that extends from a portion of the trim member 100. The lower flange 165 may be positioned along either sides of the trim member 100 along the center portion 150 and may be positionable along a bottom surface of the bed 130. The lower flange 165 may also be along the gap 140 in the upper flange 160. The lower flange 165 may be placed within the gap 140 as the gap 140 may between the upper flange 160 and the lower flange 165. The lower flanges 165 may allow the trim member 100 to be snap fit within the bed 130.

The trim member 100 may include a recessed wall 170 having a first height 172 along a first portion of the perimeter and a second height 174 along a second portion of the perimeter such that the second height 174 is greater than the first height 172. The gap 140 may be positioned along the recessed wall along the portion with the second height 174. The trim member 100 can be snap fit within an opening in the bed of the vehicle. The cover 110 may be snap fit to the trim member 100. The cover 110 may include a finger hole 190 for a user to easily attach or remove the cover 110 from the trim member 100.

Figure 21:
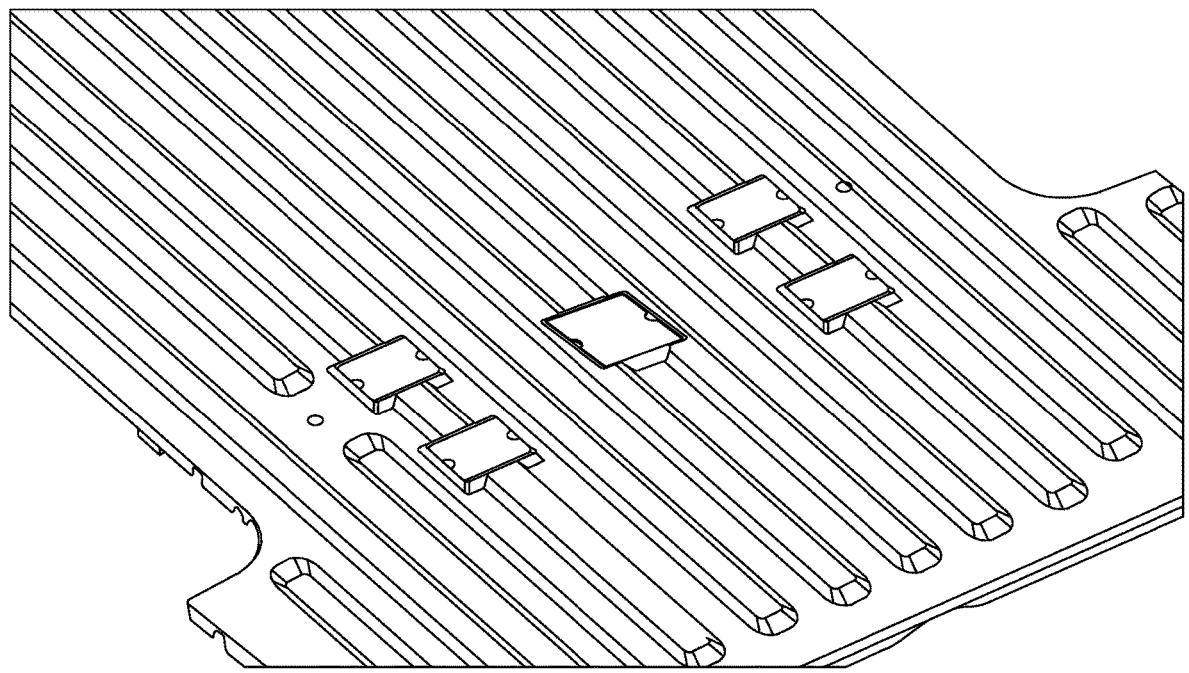
FIG. 21 illustrates a perspective view of trim members for the underbed hitch mounting system of the present invention.
Figure 22:
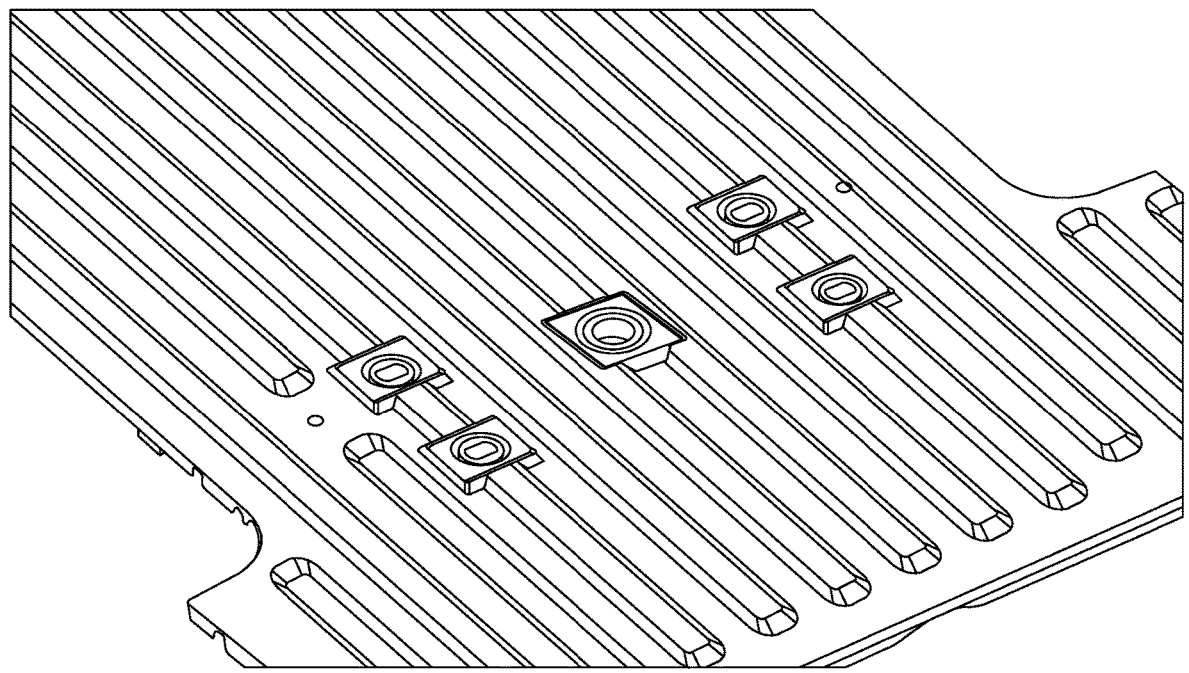
FIG. 22 illustrates a perspective view of trim members for the underbed hitch mounting system of the present invention.

In one embodiment, the first height 172 and the second height 174 of the recessed wall 170 may be generally equal wherein the upper flange 160 includes a rim elevation having a common distance from the surface of the corrugated bed 130. See FIGS. 16A, 16B, 18A, and 18B. Alternatively, the rim elevation of the upper flange 160 maybe recessed within the bed 130 such that the rim elevation of the upper flange 160 is generally aligned with the surface of the bed 130. See FIGS. 20A, 20B, and 20C. In some embodiment, the trim member 100 may include a flap portion 180 that extends between raised portions of the vehicle bed. The falp portion 180 may be positioned under and against the surface of the bed (see FIGS. 17A, 17B, 18A, 18B, 19A, and 19B) or the flap portion 180 may be positioned over and against the surface of the bed (see FIGS. 20A, 20B, and 20C). These embodiments may be used with various bed profiles and aligned along the areas of the vehicle bed as illustrated by FIGS. 21 and 22.

Although the embodiments of the present teachings have been illustrated in the accompanying drawings and described in the foregoing detailed description, it is to be understood that the present teachings are not to be limited to just the embodiments disclosed, but that the present teachings described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A towing vehicle comprising:
a load bed;
a frame positioned below the load bed;
an underbed hitch mounting system attached with the frame, wherein the underbed hitch mounting system comprises:
first and second rail mounts;
a socket positioned on each of the first and second rail mounts, each socket engageable with a receiving member; and
a mid rail connected to the first and second rail mounts;
a hitch ball socket positioned on the mid rail, the hitch ball socket engageable with a hitch;
wherein the first and second rail mounts are made from at least one of bar stock, welded tubing and sheet metal; and
first and second frame mount brackets attaching the first and second rail mounts, respectively, to the frame, wherein the first rail mount is positioned between the first frame mount bracket and the frame.

2. The towing vehicle of claim 1, wherein the first frame mount bracket is positioned between the first rail mount and the frame.

3. The towing vehicle of claim 1, wherein the first and second rail mounts each comprise a pair of rail members extending therefrom and inserted into the first and second rail mounts, wherein the sockets are positioned on the first and second rail mounts.

4. The towing vehicle of claim 3 further comprising first and second frame mount brackets attaching the pair of rail members of the first rail mount to the frame.

5. The towing vehicle of claim 4, wherein the first frame mount bracket is positioned between one of the pair of rail members and the frame.

6. The towing vehicle of claim 4, wherein one of the pair of rail members is positioned between the first frame mount bracket and the frame.

7. A towing vehicle comprising:
a load bed;
a frame positioned below the load bed;
an underbed hitch mounting system attached with the frame, wherein the underbed hitch mounting system comprises:
first and second rail mounts;
a socket positioned on each of the first and second rail mounts, each socket engageable with a receiving member; and
a mid rail connected to the first and second rail mounts;
a hitch ball socket positioned on the mid rail, the hitch ball socket engageable with a hitch;
wherein the first and second rail mounts are made from at least one of bar stock, welded tubing and sheet metal;
wherein the first and second rail mounts each comprise a pair of rail members extending therefrom and inserted into the first and second rail mounts, wherein the sockets are positioned on the first and second rail mounts;
first and second frame mount brackets attaching the pair of rail members of the first rail mount to the frame.

8. The towing vehicle of claim 7, wherein the first frame mount bracket is positioned between one of the pair of rail members and the frame.

9. The towing vehicle of claim 7, wherein one of the pair of rail members is positioned between the first frame mount bracket and the frame.

* * * * *